(12) United States Patent
Zhao et al.

(10) Patent No.: US 11,395,156 B2
(45) Date of Patent: Jul. 19, 2022

(54) DOWNLINK DATA TRANSMISSION METHOD, NETWORK DEVICE, AND TERMINAL

(71) Applicant: Huawei Technologies Co., Ltd., Shenzhen (CN)

(72) Inventors: Peiyao Zhao, Beijing (CN); Zhaocheng Wang, Beijing (CN); Kai Xu, Shenzhen (CN); Hongcheng Zhuang, Shenzhen (CN); Yanliang Sun, Shenzhen (CN); Lili Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/057,462

(22) PCT Filed: May 21, 2019

(86) PCT No.: PCT/CN2019/087689
§ 371 (c)(1),
(2) Date: Nov. 20, 2020

(87) PCT Pub. No.: WO2019/223665
PCT Pub. Date: Nov. 28, 2019

(65) Prior Publication Data
US 2021/0185547 A1 Jun. 17, 2021

(30) Foreign Application Priority Data

May 23, 2018 (CN) .......................... 201810504111.4
Aug. 7, 2018 (CN) .......................... 201810893428.1

(51) Int. Cl.
*H04W 16/28* (2009.01)
*H04W 72/04* (2009.01)
*H04W 72/08* (2009.01)

(52) U.S. Cl.
CPC ......... *H04W 16/28* (2013.01); *H04W 72/046* (2013.01); *H04W 72/08* (2013.01)

(58) Field of Classification Search
CPC ..... H04W 72/04; H04W 72/08; H04W 16/28; H04W 76/27; H04W 76/36; H04W 72/1242; H04W 72/0446
See application file for complete search history.

(56) References Cited

U.S. PATENT DOCUMENTS

| | | | |
|---|---|---|---|
| 7,366,463 | B1 | 4/2008 | Archer et al. |
| 2009/0178483 | A1 | 7/2009 | Angelsen et al. |

(Continued)

FOREIGN PATENT DOCUMENTS

| | | |
|---|---|---|
| CN | 101978661 A | 2/2011 |
| CN | 103596245 A | 2/2014 |

(Continued)

OTHER PUBLICATIONS

Huawei, et al., "Beam Management Procedure for NR MIMO," 3GPP TSG RAN WG1 Meeting #86, Gothenburg, Sweden, R1-166089, Aug. 22-26, 2016, 6 pages.

(Continued)

*Primary Examiner* — Anez C Ebrahim
(74) *Attorney, Agent, or Firm* — Conley Rose, P.C.

(57) ABSTRACT

A communication method includes receiving first beam feedback information from a wide beam terminal, where the first beam feedback information includes information about a first wide beam and information about M wide beams whose signal quality meets a first condition, receiving second beam feedback information from a narrow beam terminal, where the second beam feedback information includes information about a second wide beam and information about N wide beams whose signal quality meets a second condition, receiving, from the narrow beam terminal, infor- (Continued)

mation about a first narrow beam, where the first narrow beam is a narrow beam covered by the second wide beam, and determining, based on the first beam feedback information, the second beam feedback information, and the information about the first narrow beam, whether to transmit downlink data to the wide beam terminal and the narrow beam terminal.

20 Claims, 11 Drawing Sheets

(56) References Cited

U.S. PATENT DOCUMENTS

| | | |
|---|---|---|
| 2009/0232240 A1 | 9/2009 | Lakkis |
| 2014/0152986 A1 | 6/2014 | Trainer |
| 2017/0104517 A1 | 4/2017 | Kakishima et al. |
| 2018/0287680 A1 | 10/2018 | Xu et al. |
| 2018/0302858 A1* | 10/2018 | Son .................. H04W 74/00 |

FOREIGN PATENT DOCUMENTS

| | | |
|---|---|---|
| CN | 104956604 A | 9/2015 |
| CN | 105790886 A | 7/2016 |
| CN | 106105073 A | 11/2016 |
| CN | 106559120 A | 4/2017 |
| WO | 2018009516 A1 | 1/2018 |

OTHER PUBLICATIONS

Samsung, "Discussion on TRP beamforming and beam management," 3GPP TSG RAN WG1 #85, Gothenburg, Sweden, R1-166785, Aug. 22-26, 2016, 5 pages.

Huawei, et al., "Antenna Structure Impacts on MIMO transmission," 3GPP TSG RAN WG1 Meeting #86bis, Lisbon, Portugal, R1-1608851, Oct. 10-14, 2016. 5 pages.

* cited by examiner

Narrow beam terminal    Network device    Wide beam terminal

DOWNLINK DATA TRANSMISSION METHOD, NETWORK DEVICE, AND TERMINAL

CROSS-REFERENCE TO RELATED APPLICATIONS

This application is a U.S. National Stage of International Patent Application No. PCT/CN2019/087689 filed on May 21, 2019, which claims priority to Chinese Patent Application No. 201810504111.4 filed on May 23, 2018 and Chinese Patent Application No. 201810893428.1 filed on Aug. 7, 2018. All of the aforementioned applications are hereby incorporated by reference in their entireties.

TECHNICAL FIELD

This application relates to the field of communications technologies, and in particular, to a downlink data transmission method, a network device, and a terminal.

BACKGROUND

A multiple-input multiple-output (Multiple-Input Multiple-Output, MIMO) technology is an important technology in a communications system. The MEMO technology can increase a system capacity and improve spectral efficiency, so that the system can obtain a higher transmission rate and a higher system throughput under a limited spectrum resource. By using a plurality of antennas at both a receive end and a transmit end of the communications system, a spatial multiplexing gain can be obtained, and a capacity of a communications channel can be increased.

In the prior art, when downlink data transmission is performed by using the MIMO technology, for example, the communications system includes a base station, a wide beam terminal, and a narrow beam terminal, the wide beam terminal may be understood as a terminal that is using a wide beam or is about to use a wide beam, and the narrow beam terminal may be understood as a terminal that is using a narrow beam or is about to use a narrow beam. FIG. 1 is a schematic diagram of a downlink data transmission method in the prior art. After receiving a wide beam with maximum reference signal received power (Reference Signal Receiving Power, RSRP) fed back by the wide beam terminal and a narrow beam with maximum RSRP fed back by the narrow beam terminal, the base station needs to perform interference measurement on the wide beam with maximum RSRP and the narrow beam with maximum RSRP. Specifically, in S103, the base station sends an orthogonal reference signal to the wide beam terminal and the narrow beam terminal, so that the wide beam terminal and the narrow beam terminal can separately measure, based on the orthogonal reference signal, signal strength of and strength of interference to a beam fed back by each of the wide beam terminal and the narrow beam terminal, and feed back, to the base station, the signal strength of and the strength of interference to the beam fed back by each of the wide beam terminal and the narrow beam terminal. The base station may determine signal-to-interference ratios of the wide beam terminal and the narrow beam terminal based on the fed back signal strength and interference strength, and determine, based on the obtained signal-to-interference ratios, whether to perform downlink data transmission.

However, in an existing downlink data transmission method, interference measurement needs to be first performed by sending an orthogonal reference signal. The orthogonal reference signal occupies a specific time-frequency resource, resulting in relatively large overheads of interference measurement. In addition, a wide beam terminal and a narrow beam terminal may separately measure, based on the orthogonal reference signal, signal strength of and strength of interference to a beam fed back by each of the wide beam terminal and the narrow beam terminal, and feed back, to a base station, the signal strength of and the strength of interference to the beam fed back by each of the wide beam terminal and the narrow beam terminal. Consequently, a specific time needs to be occupied, resulting in a relatively large delay of interference measurement.

SUMMARY

This application provides a downlink data transmission method, a network device, and a terminal, so as to reduce overheads and a delay of interference measurement when downlink data transmission is performed.

According to a first aspect, an embodiment of this application provides a downlink data transmission method, where the downlink data transmission method may include:

receiving first beam feedback information from a wide beam terminal, where the first beam feedback information includes information about a first wide beam to be used by the wide beam terminal and information about M wide beams whose signal quality meets a first condition, and M is an integer greater than or equal to 1;

receiving second beam feedback information from a narrow beam terminal, where the second beam feedback information includes information about a second wide beam determined by the narrow beam terminal and information about N wide beams whose signal quality meets a second condition, and N is an integer greater than or equal to 1;

receiving, from the narrow beam terminal, information about a first narrow beam to be used by the narrow beam terminal, where the first narrow beam is a narrow beam that is covered by the second wide beam; and determining, based on the first beam feedback information, the second beam feedback information, and the information about the first narrow beam, whether to transmit downlink data to the wide beam terminal and the narrow beam terminal.

It can be learned that in the method provided in this embodiment of this application, whether to transmit downlink data to the wide beam terminal and the narrow beam terminal may be determined directly based on the first beam feedback information, the second beam feedback information, and the information about the first narrow beam. Compared with the prior art, no additional orthogonal reference signal needs to be sent to perform interference measurement, thereby reducing resource overheads caused by the reference signal and reducing a delay caused by interference measurement.

In a possible implementation, the M wide beams are M wide beams with minimum signal quality in a candidate wide beam used for downlink sending. Alternatively, the M wide beams are M wide beams whose signal quality is less than a first threshold in a candidate wide beam.

The N wide beams are N wide beams with minimum signal quality in the candidate wide beam. Alternatively, the N wide beams are N wide beams whose signal quality is less than a second threshold in the candidate wide beam.

In a possible implementation, the determining, based on the first beam feedback information, the second beam feedback information, and the information about the first narrow beam, whether to transmit downlink data to the wide beam terminal and the narrow beam terminal includes:

when a parent beam of the first narrow beam is any one of the M wide beams, and the first wide beam is any one of the N wide beams, determining respective signal-to-interference ratios of the wide beam terminal and the narrow beam terminal; and if both the signal-to-interference ratio of the wide beam terminal and the signal-to-interference ratio of the narrow beam terminal are greater than a third threshold, determining to transmit downlink data to the narrow beam terminal on the first narrow beam, and transmit downlink data to the wide beam terminal on the first wide beam.

In a possible implementation, the information about the first wide beam includes reference signal received power RSRP of the first wide beam, the information about the first narrow beam includes RSRP of the first narrow beam, and the determining respective signal-to-interference ratios of the wide beam terminal and the narrow beam terminal includes:

determining a product of RSRP of the parent beam, of the first narrow beam, in the M wide beams and a parameter, where the parameter is a square of a maximum gain difference;

determining the signal-to-interference ratio of the wide beam terminal based on a ratio of the RSRP of the first wide beam to the product; and determining the signal-to-interference ratio of the narrow beam terminal based on a ratio of the RSRP of the first narrow beam to the RSRP of the first wide beam in the N wide beams.

In a possible implementation, the determining, based on the first beam feedback information, the second beam feedback information, and the information about the first narrow beam, whether to transmit downlink data to the wide beam terminal and the narrow beam terminal includes:

when a parent beam of the first narrow beam is the first wide beam, receiving a third beam feedback message from the wide beam terminal; where the third beam feedback message includes information about P narrow beams whose signal quality meets a third condition, and P is an integer greater than or equal to 1; and determining, based on the first narrow beam and the third beam feedback message, whether to transmit downlink data to the narrow beam terminal on the first narrow beam, and transmit downlink data to the wide beam terminal on the first wide beam.

In a possible implementation, the P narrow beams are P narrow beams whose signal quality is less than a third threshold in a candidate narrow beam covered by the first wide beam and used for downlink sending.

In a possible implementation, the determining, based on the first narrow beam and the third beam feedback message, whether to transmit downlink data to the narrow beam terminal on the first narrow beam, and transmit downlink data to the wide beam terminal on the first wide beam includes:

if the first narrow beam is any one of the P narrow beams, determining respective signal-to-interference ratios of the wide beam terminal and the narrow beam terminal; and if both the signal-to-interference ratio of the wide beam terminal and the signal-to-interference ratio of the narrow beam terminal are greater than a fourth threshold, determining to transmit downlink data to the narrow beam terminal on the first narrow beam, and transmit downlink data to the wide beam terminal on the first wide beam.

In a possible implementation, the information about the first wide beam includes RSRP of the first wide beam, the information about the first narrow beam includes RSRP of the first narrow beam, and the determining respective signal-to-interference ratios of the wide beam terminal and the narrow beam terminal includes:

determining the signal-to-interference ratio of the wide beam terminal based on a ratio of the RSRP of the first wide beam to the RSRP of the first narrow beam in the P narrow beams; and determining the signal-to-interference ratio of the narrow beam terminal based on a ratio of the RSRP of the first narrow beam to the RSRP of the first wide beam in the N wide beams.

In a possible implementation, the downlink data transmission method may further include:

if the first narrow beam is not any one of the P pieces of narrow beam, determining not to transmit downlink data to the narrow beam terminal on the first narrow beam, and not to transmit downlink data to the wide beam terminal on the first wide beam.

In a possible implementation, before the determining, based on the first narrow beam and the third beam feedback message, whether to transmit downlink data to the narrow beam terminal on the first narrow beam, and transmit downlink data to the wide beam terminal on the first wide beam, the method further includes:

if P is greater than or equal to a fifth threshold, stopping scanning the candidate narrow beam that is covered by the first wide beam and used for downlink sending.

In a possible implementation, before the receiving a third beam feedback message from the wide beam terminal, the method further includes:

scanning the candidate narrow beam that is covered by the first wide beam and used for downlink sending.

According to a second aspect, an embodiment of this application further provides a downlink data transmission method, where the downlink data transmission method may include:

when a candidate wide beam that is scanned by a base station and used for downlink sending is received, determining, from the candidate wide beam, information about a first wide beam to be used by a wide beam terminal and information about M wide beams whose signal quality meets a first condition, where M is an integer greater than or equal to 1; and sending first beam feedback information to the base station, where the first beam feedback information includes the information about the first wide beam and the information about the M wide beams.

In a possible implementation, the M wide beams are M wide beams with minimum signal quality in the candidate wide beam. Alternatively, the M wide beams are M wide beams whose signal quality is less than a first threshold in the candidate wide beam.

In a possible implementation, the downlink data transmission method may further include:

receiving a candidate narrow beam that is scanned by the base station, covered by the first wide beam, and used for downlink sending, where the candidate narrow beam is sent by the base station when determining that a parent beam of a first narrow beam to be used by the narrow beam terminal is the first wide beam;

determining, from the candidate narrow beam, information about P narrow beams whose signal quality meets a third condition, where P is an integer greater than or equal to 1; and sending a third beam feedback message to the base station; where the third beam feedback message includes the information about the P narrow beams.

In a possible implementation, the P narrow beams are P narrow beams whose signal quality is less than a third threshold in the candidate narrow beam.

According to a third aspect, an embodiment of this application further provides a downlink data transmission method, where the downlink data transmission method may include:

when a candidate wide beam that is scanned by a base station and used for downlink sending is received, determining, from the candidate wide beam, information about a second wide beam determined by a narrow beam terminal and information about N wide beams whose signal quality meets a second condition, where N is an integer greater than or equal to 1;

sending second beam feedback information to the base station, where the second beam feedback information includes the information about the second wide beam and the information about the N wide beams;

when a candidate narrow beam that is scanned by the base station, covered by the second wide beam, and used for downlink sending is received, determining, from the candidate narrow beam that is covered by the second wide beam, a first narrow beam to be used by the narrow beam terminal; and sending, to the base station, information about the first narrow beam to be used by the narrow beam terminal.

In a possible implementation, the N wide beams are N wide beams with minimum signal quality in the candidate wide beam. Alternatively, the N wide beams are N wide beams whose signal quality is less than a second threshold in the candidate wide beam.

According to a fourth aspect, an embodiment of this application further provides a network device, where the network device may include:

a receiving unit, configured to receive first beam feedback information from a wide beam terminal, where the first beam feedback information includes information about a first wide beam to be used by the wide beam terminal and information about M wide beams whose signal quality meets a first condition, and M is an integer greater than or equal to 1, where the receiving unit is further configured to receive second beam feedback information from a narrow beam terminal, where the second beam feedback information includes information about a second wide beam determined by the narrow beam terminal and information about N wide beams whose signal quality meets a second condition, and N is an integer greater than or equal to 1; and the receiving unit is further configured to receive, from the narrow beam terminal, information about a first narrow beam to be used by the narrow beam terminal, where the first narrow beam is a narrow beam that is covered by the second wide beam; and a determining unit, configured to determine, based on the first beam feedback information, the second beam feedback information, and the information about the first narrow beam, whether to transmit downlink data to the wide beam terminal and the narrow beam terminal.

In a possible implementation, the M wide beams are M wide beams with minimum signal quality in a candidate wide beam used for downlink sending. Alternatively, the M wide beams are M wide beams whose signal quality is less than a first threshold in a candidate wide beam.

The N wide beams are N wide beams with minimum signal quality in the candidate wide beam. Alternatively, the N wide beams are N wide beams whose signal quality is less than a second threshold in the candidate wide beam.

In a possible implementation, the determining unit is specifically configured to: when a parent beam of the first narrow beam is any one of the M wide beams, and the first wide beam is any one of the N wide beams, determine respective signal-to-interference ratios of the wide beam terminal and the narrow beam terminal; and if both the signal-to-interference ratio of the wide beam terminal and the signal-to-interference ratio of the narrow beam terminal are greater than a third threshold, determine to transmit downlink data to the narrow beam terminal on the first narrow beam, and transmit downlink data to the wide beam terminal on the first wide beam.

In a possible implementation, the information about the first wide beam includes reference signal received power RSRP of the first wide beam, and the information about the first narrow beam includes RSRP of the first narrow beam;

the determining unit is specifically configured to determine a product of RSRP of the parent beam, of the first narrow beam, in the M wide beams and a parameter, where the parameter is a square of a maximum gain difference; and determine the signal-to-interference ratio of the wide beam terminal based on a ratio of the RSRP of the first wide beam to the product; and the determining unit is further specifically configured to determine the signal-to-interference ratio of the narrow beam terminal based on a ratio of the RSRP of the first narrow beam to the RSRP of the first wide beam in the N wide beams.

In a possible implementation, the determining unit is specifically configured to: when a parent beam of the first narrow beam is the first wide beam, receive a third beam feedback message from the wide beam terminal, where the third beam feedback message includes information about P narrow beams whose signal quality meets a third condition, and P is an integer greater than or equal to 1; and determine, based on the first narrow beam and the third beam feedback message, whether to transmit downlink data to the narrow beam terminal on the first narrow beam, and transmit downlink data to the wide beam terminal on the first wide beam.

In a possible implementation, the P narrow beams are P narrow beams whose signal quality is less than a third threshold in a candidate narrow beam covered by the first wide beam and used for downlink sending.

In a possible implementation, the determining unit is specifically configured to: if the first narrow beam is any one of the P narrow beams, determine respective signal-to-interference ratios of the wide beam terminal and the narrow beam terminal; and if both the signal-to-interference ratio of the wide beam terminal and the signal-to-interference ratio of the narrow beam terminal are greater than a fourth threshold, determine to transmit downlink data to the narrow beam terminal on the first narrow beam, and transmit downlink data to the wide beam terminal on the first wide beam.

In a possible implementation, the information about the first wide beam includes RSRP of the first wide beam, and the information about the first narrow beam includes RSRP of the first narrow beam; and the determining unit is specifically configured to determine the signal-to-interference ratio of the wide beam terminal based on a ratio of the RSRP of the first wide beam to the RSRP of the first narrow beam in the P narrow beams;

and determine the signal-to-interference ratio of the narrow beam terminal based on a ratio of the RSRP of the first narrow beam to the RSRP of the first wide beam in the N wide beams.

In a possible implementation, the determining unit is further configured to: if the first narrow beam is not any one of the P pieces of narrow beam, determine not to transmit downlink data to the narrow beam terminal on the first narrow beam, and not to transmit downlink data to the wide beam terminal on the first wide beam.

In a possible implementation, the network device may further include:

a scanning unit, configured to: if P is greater than or equal to a fifth threshold, stop scanning the candidate narrow beam that is covered by the first wide beam and used for downlink sending.

In a possible implementation, the scanning unit is further configured to scan the candidate narrow beam that is covered by the first wide beam and used for downlink sending.

According to a fifth aspect, an embodiment of this application further provides a wide beam terminal, where the wide beam terminal may include:

a determining unit, configured to: when a candidate wide beam that is scanned by a base station and used for downlink sending is received, determine, from the candidate wide beam, information about a first wide beam to be used by the wide beam terminal and information about M wide beams whose signal quality meets a first condition, where M is an integer greater than or equal to 1; and a sending unit; configured to send first beam feedback information to the base station, where the first beam feedback information includes the information about the first wide beam and the information about the M wide beams.

In a possible implementation, the M wide beams are M wide beams with minimum signal quality in the candidate wide beam. Alternatively, the M wide beams are M wide beams whose signal quality is less than a first threshold in the candidate wide beam.

In a possible implementation, the wide beam terminal may further include:

a receiving unit, configured to receive a candidate narrow beam that is scanned by the base station, covered by the first wide beam, and used for downlink sending, where the candidate narrow beam is sent by the base station when determining that a parent beam of a first narrow beam to be used by a narrow beam terminal is the first wide beam;

the determining unit is further configured to determine, from the candidate narrow beam, information about P narrow beams whose signal quality meets a third condition, where P is an integer greater than or equal to 1; and the sending unit is further configured to send a third beam feedback message to the base station; where the third beam feedback message includes the information about the P narrow beams.

In a possible implementation, the P narrow beams are P narrow beams whose signal quality is less than a third threshold in the candidate narrow beam.

According to a sixth aspect, an embodiment of this application further provides a narrow beam terminal, where the narrow beam terminal may include:

a determining unit, configured to: when a candidate wide beam that is scanned by a base station and used for downlink sending is received, determine, from the candidate wide beam, information about a second wide beam determined by the narrow beam terminal and information about N wide beams whose signal quality meets a second condition, where N is an integer greater than or equal to 1; and a sending unit, configured to send second beam feedback information to the base station, where the second beam feedback information includes the information about the second wide beam and the information about the N wide beams, where the determining unit is further configured to: when a candidate narrow beam that is scanned by the base station, covered by the second wide beam, and used for downlink sending is received, determine, from the candidate narrow beam that is covered by the second wide beam, a first narrow beam to be used by the narrow beam terminal; and the sending unit is further configured to send; to the base station, information about the first narrow beam to be used by the narrow beam terminal.

In a possible implementation, the N wide beams are N wide beams with minimum signal quality in the candidate wide beam. Alternatively, the N wide beams are N wide beams whose signal quality is less than a second threshold in the candidate wide beam.

According to a seventh aspect, an embodiment of this application further provides a network device, where the network device may include:

a receiver, configured to receive first beam feedback information from a wide beam terminal, where the first beam feedback information includes information about a first wide beam to be used by the wide beam terminal and information about M wide beams whose signal quality meets a first condition, and M is an integer greater than or equal to 1, where the receiver is further configured to receive second beam feedback information from a narrow beam terminal, where the second beam feedback information includes information about a second wide beam determined by the narrow beam terminal and information about N wide beams whose signal quality meets a second condition, and N is an integer greater than or equal to 1; and the receiver is further configured to receive, from the narrow beam terminal, information about a first narrow beam to be used by the narrow beam terminal, where the first narrow beam is a narrow beam that is covered by the second wide beam; and a processor, configured to determine, based on the first beam feedback information, the second beam feedback information, and the information about the first narrow beam, whether to transmit downlink data to the wide beam terminal and the narrow beam terminal.

In a possible implementation, the M wide beams are M wide beams with minimum signal quality in a candidate wide beam used for downlink sending. Alternatively, the M wide beams are M wide beams whose signal quality is less than a first threshold in a candidate wide beam.

The N wide beams are N wide beams with minimum signal quality in the candidate wide beam. Alternatively, the N wide beams are N wide beams whose signal quality is less than a second threshold in the candidate wide beam.

In a possible implementation, the determining, based on the first beam feedback information, the second beam feedback information, and the information about the first narrow beam, whether to transmit downlink data to the wide beam terminal and the narrow beam terminal includes:

when a parent beam of the first narrow beam is any one of the M wide beams, and the first wide beam is any one of the N wide beams, determining respective signal-to-interference ratios of the wide beam terminal and the narrow beam terminal; and if both the signal-to-interference ratio of the wide beam terminal and the signal-to-interference ratio of the narrow beam terminal are greater than a third threshold, determining to transmit downlink data to the narrow beam terminal on the first narrow beam, and transmit downlink data to the wide beam terminal on the first wide beam.

In a possible implementation, the information about the first wide beam includes reference signal received power RSRP of the first wide beam, and the determining respective signal-to-interference ratios of the wide beam terminal and the narrow beam terminal includes:

determining a product of RSRP of the parent beam, of the first narrow beam; in the M wide beams and a parameter; where the parameter is a square of a maximum gain difference; determining the signal-to-interference ratio of the wide beam terminal based on a ratio of the RSRP of the first wide beam to the product; and determining the signal-to-interference ratio of the narrow beam terminal based on a ratio of the RSRP of the first narrow beam to the RSRP of the first wide beam in the N wide beams.

In a possible implementation, the receiver is further configured to: when a parent beam of the first narrow beam is the first wide beam, receive a third beam feedback message from the wide beam terminal, where the third beam feedback message includes information about P narrow beams whose signal quality meets a third condition, and P is an integer greater than or equal to 1; and the determining, based on the first beam feedback information, the second beam feedback information, and the information about the first narrow beam, whether to transmit downlink data to the wide beam terminal and the narrow beam terminal includes: determining, based on the first narrow beam and the third beam feedback message, whether to transmit downlink data to the narrow beam terminal on the first narrow beam, and transmit downlink data to the wide beam terminal on the first wide beam.

In a possible implementation, the determining, based on the first narrow beam and the third beam feedback message, whether to transmit downlink data to the narrow beam terminal on the first narrow beam, and transmit downlink data to the wide beam terminal on the first wide beam includes:

if the first narrow beam is any one of the P narrow beams, determining respective signal-to-interference ratios of the wide beam terminal and the narrow beam terminal; and if both the signal-to-interference ratio of the wide beam terminal and the signal-to-interference ratio of the narrow beam terminal are greater than a fourth threshold, determining to transmit downlink data to the narrow beam terminal on the first narrow beam, and transmit downlink data to the wide beam terminal on the first wide beam.

In a possible implementation, the information about the first wide beam includes RSRP of the first wide beam, and the determining respective signal-to-interference ratios of the wide beam terminal and the narrow beam terminal includes: determining the signal-to-interference ratio of the wide beam terminal based on a ratio of the RSRP of the first wide beam to the RSRP of the first narrow beam in the P narrow beams; and determining the signal-to-interference ratio of the narrow beam terminal based on a ratio of the RSRP of the first narrow beam to the RSRP of the first wide beam in the N wide beams.

In a possible implementation, the determining, based on the first narrow beam and the third beam feedback message, whether to transmit downlink data to the narrow beam terminal on the first narrow beam, and transmit downlink data to the wide beam terminal on the first wide beam further includes: if the first narrow beam is not any one of the P pieces of narrow beam, determining not to transmit downlink data to the narrow beam terminal on the first narrow beam, and not to transmit downlink data to the wide beam terminal on the first wide beam.

In a possible implementation, the processor is further configured to: if P is greater than or equal to a fifth threshold, stop scanning the candidate narrow beam that is covered by the first wide beam and used for downlink sending.

In a possible implementation, the processor is further configured to scan the candidate narrow beam that is covered by the first wide beam and used for downlink sending.

According to an eighth aspect, an embodiment of this application further provides a wide beam terminal, where the wide beam terminal may include:

a processor, configured to: when a candidate wide beam that is scanned by a base station and used for downlink sending is received, determine, from the candidate wide beam, information about a first wide beam to be used by the wide beam terminal and information about M wide beams whose signal quality meets a first condition, where M is an integer greater than or equal to 1; and a transmitter, configured to send first beam feedback information to the base station, where the first beam feedback information includes the information about the first wide beam and the information about the M wide beams.

In a possible implementation, the M wide beams are M wide beams with minimum signal quality in the candidate wide beam. Alternatively, the M wide beams are M wide beams whose signal quality is less than a first threshold in the candidate wide beam.

In a possible implementation, the wide beam terminal may further include:

a receiver, configured to receive a candidate narrow beam that is scanned by the base station, covered by the first wide beam, and used for downlink sending, where the candidate narrow beam is sent by the base station when determining that a parent beam of a first narrow beam to be used by a narrow beam terminal is the first wide beam;

the processor is further configured to determine, from the candidate narrow beam, information about P narrow beams whose signal quality meets a third condition, where P is an integer greater than or equal to 1; and the transmitter is further configured to send a third beam feedback message to the base station, where the third beam feedback message includes the information about the P narrow beams.

According to a ninth aspect, an embodiment of this application further provides a narrow beam terminal, where the narrow beam terminal may include:

a processor, configured to: when a candidate wide beam that is scanned by a base station and used for downlink sending is received, determine, from the candidate wide beam, information about a second wide beam determined by the narrow beam terminal and information about N wide beams whose signal quality meets a second condition, where N is an integer greater than or equal to 1; and a transmitter, configured to send second beam feedback information to the base station, where the second beam feedback information includes the information about the second wide beam and the information about the N wide beams, where the processor is further configured to: when a candidate narrow beam that is scanned by the base station, covered by the second wide beam, and used for downlink sending is received, determine, from the candidate narrow beam that is covered by the second wide beam, a first narrow beam to be used by the narrow beam terminal; and the transmitter is further configured to send, to the base station, information about the first narrow beam to be used by the narrow beam terminal.

In a possible implementation, the N wide beams are N wide beams with minimum signal quality in the candidate wide beam. Alternatively, the N wide beams are N wide beams whose signal quality is less than a second threshold in the candidate wide beam.

According to a tenth aspect, an embodiment of this application further provides a computer-readable storage medium, where a computer program is stored in the computer-readable storage medium, and when the computer program is executed by a processor, the downlink data transmission method shown in any design of the first aspect is performed.

According to an eleventh aspect, an embodiment of this application further provides a computer-readable storage medium, where a computer program is stored in the computer-readable storage medium, and when the computer program is executed by a processor, the downlink data transmission method shown in any design of the second aspect is performed, or the downlink data transmission method shown in any design of the third aspect is performed.

According to a twelfth aspect, an embodiment of this application further provides a circuit system, and the circuit system may include a processing circuit;

after first beam feedback information from a wide beam terminal, second beam feedback information from a narrow beam terminal, and information about a first narrow beam to be used by the narrow beam terminal from the narrow beam terminal are received, where the first narrow beam is a narrow beam that is covered by a second wide beam, the processing circuit is configured to: determine, based on the first beam feedback information, the second beam feedback information, and the information about the first narrow beam, whether to transmit downlink data to the wide beam terminal and the narrow beam terminal, where the first beam feedback information includes information about a first wide beam to be used by the wide beam terminal and information about M wide beams whose signal quality meets a first condition, and M is an integer greater than or equal to 1; and the second beam feedback information includes information about a second wide beam determined by the narrow beam terminal and information about N wide beams whose signal quality meets a second condition, and N is an integer greater than or equal to 1.

In a possible implementation, the M wide beams are M wide beams with minimum signal quality in a candidate wide beam used for downlink sending. Alternatively, the M wide beams are M wide beams whose signal quality is less than a first threshold in a candidate wide beam.

The N wide beams are N wide beams with minimum signal quality in the candidate wide beam. Alternatively, the N wide beams are N wide beams whose signal quality is less than a second threshold in the candidate wide beam.

In a possible implementation, the determining, based on the first beam feedback information, the second beam feedback information, and the information about the first narrow beam, whether to transmit downlink data to the wide beam terminal and the narrow beam terminal includes:

when a parent beam of the first narrow beam is any one of the M wide beams, and the first wide beam is any one of the N wide beams, determining respective signal-to-interference ratios of the wide beam terminal and the narrow beam terminal; and if both the signal-to-interference ratio of the wide beam terminal and the signal-to-interference ratio of the narrow beam terminal are greater than a third threshold, determining to transmit downlink data to the narrow beam terminal on the first narrow beam; and transmit downlink data to the wide beam terminal on the first wide beam.

In a possible implementation, the information about the first wide beam includes reference signal received power RSRP of the first wide beam, and the determining respective signal-to-interference ratios of the wide beam terminal and the narrow beam terminal includes:

determining a product of RSRP of the parent beam, of the first narrow beam, in the M wide beams and a parameter, where the parameter is a square of a maximum gain difference; determining the signal-to-interference ratio of the wide beam terminal based on a ratio of the RSRP of the first wide beam to the product; and determining the signal-to-interference ratio of the narrow beam terminal based on a ratio of the RSRP of the first narrow beam to the RSRP of the first wide beam in the N wide beams.

In a possible implementation, a parent beam of the first narrow beam is the first wide beam, and the determining, based on the first beam feedback information, the second beam feedback information, and the information about the first narrow beam, whether to transmit downlink data to the wide beam terminal and the narrow beam terminal includes:

determining, based on the first narrow beam and the third beam feedback message, whether to transmit downlink data to the narrow beam terminal on the first narrow beam, and transmit downlink data to the wide beam terminal on the first wide beam, where the third beam feedback message includes information about P narrow beams whose signal quality meets a third condition, and P is an integer greater than or equal to 1.

In a possible implementation, the determining, based on the first narrow beam and the third beam feedback message, whether to transmit downlink data to the narrow beam terminal on the first narrow beam includes:

if the first narrow beam is any one of the P narrow beams, determining respective signal-to-interference ratios of the wide beam terminal and the narrow beam terminal; and if both the signal-to-interference ratio of the wide beam terminal and the signal-to-interference ratio of the narrow beam terminal are greater than a fourth threshold, determining to transmit downlink data to the narrow beam terminal on the first narrow beam, and transmit downlink data to the wide beam terminal on the first wide beam.

In a possible implementation, the information about the first wide beam includes RSRP of the first wide beam, and the determining respective signal-to-interference ratios of the wide beam terminal and the narrow beam terminal includes: determining the signal-to-interference ratio of the wide beam terminal based on a ratio of the RSRP of the first wide beam to the RSRP of the first narrow beam in the P narrow beams; and determining the signal-to-interference ratio of the narrow beam terminal based on a ratio of the RSRP of the first narrow beam to the RSRP of the first wide beam in the N wide beams.

In a possible implementation, the determining, based on the first narrow beam and the third beam feedback message, whether to transmit downlink data to the narrow beam terminal on the first narrow beam further includes: if the first narrow beam is not any one of the P pieces of narrow beam, determining not to transmit downlink data to the narrow beam terminal on the first narrow beam, and not to transmit downlink data to the wide beam terminal on the first wide beam.

In a possible implementation, the processing circuit is further configured to: if P is greater than or equal to a fifth threshold, stop scanning the candidate narrow beam that is covered by the first wide beam and used for downlink sending.

In a possible implementation, the processing circuit is further configured to scan the candidate narrow beam that is covered by the first wide beam and used for downlink sending.

According to a thirteenth aspect, an embodiment of this application further provides a circuit system, and the circuit system may include a processing circuit;

the processing circuit is configured to: when a candidate wide beam that is scanned by a base station and used for downlink sending is received, determine, from the candidate wide beam, information about a first wide beam to be used by the wide beam terminal and information about M wide beams whose signal quality meets a first condition, where M is an integer greater than or equal to 1.

In a possible implementation, the M wide beams are M wide beams with minimum signal quality in the candidate wide beam. Alternatively, the M wide beams are M wide beams whose signal quality is less than a first threshold in the candidate wide beam.

In a possible implementation, the processing circuit is further configured to: after a candidate narrow beam that is scanned by the base station, covered by the first wide beam, and used for downlink sending is received, determine, from the candidate narrow beam, information about P narrow beams whose signal quality meets a third condition, where P is an integer greater than or equal to 1 and the candidate narrow beam is sent by the base station when determining that a parent beam of a first narrow beam to be used by the narrow beam terminal is the first wide beam.

According to a fourteenth aspect, an embodiment of this application further provides a circuit system, and the circuit system may include a processing circuit;

the processing circuit is configured to: when a candidate wide beam that is scanned by a base station and used for downlink sending is received, determine, from the candidate wide beam, information about a second wide beam determined by the narrow beam terminal and information about N wide beams whose signal quality meets a second condition, where N is an integer greater than or equal to 1; and the processing circuit is further configured to: after second beam feedback information is sent to the base station, when a candidate narrow beam that is scanned by the base station, covered by the second wide beam, and used for downlink sending is received, determine, from the candidate narrow beam that is covered by the second wide beam, a first narrow beam to be used by the narrow beam terminal, where the second beam feedback information includes the information about the second wide beam and the information about the N wide beams.

In a possible implementation, the N wide beams are N wide beams with minimum signal quality in the candidate wide beam. Alternatively, the N wide beams are N wide beams whose signal quality is less than a second threshold in the candidate wide beam.

According to a fifteenth aspect, an embodiment of this application further provides a communications system, where the communications system includes the network device shown in the fourth aspect, the wide beam terminal shown in the fifth aspect, and the narrow beam terminal shown in the sixth aspect, or includes the network device shown in the seventh aspect, the wide beam terminal shown in the eighth aspect, and the narrow beam terminal shown in the ninth aspect.

In the downlink data transmission method, the network device, and the terminals provided in the embodiments of this application, the first beam feedback information is received from the wide beam terminal. The first beam feedback information includes the information about the first wide beam to be used by the wide beam terminal and the information about the M wide beams whose signal quality meets the first condition. The second beam feedback information is received from the narrow beam terminal. The second beam feedback information includes the information about the second wide beam determined by the narrow beam terminal and the information about the N wide beams whose signal quality meets the second condition. The information about the first narrow beam to be used by the narrow beam terminal is received from the narrow beam terminal. The first narrow beam is a narrow beam that is covered by the second wide beam. In this way, whether to transmit downlink data to the wide beam terminal and the narrow beam terminal may be directly determined based on the first beam feedback information, the second beam feedback information, and the information about the first narrow beam. Compared with the prior art, no additional orthogonal reference signal needs to be sent to perform interference measurement, thereby reducing resource overheads caused by the reference signal, and reducing a delay caused by interference measurement.

DESCRIPTION OF EMBODIMENTS

Embodiments of this application may be applied to various communications systems, for example, a Global system for mobile communications (Global System of Mobile communication, GSM) system, a Code Division Multiple Access (Code Division Multiple Access, CDMA) system, a Wideband Code Division Multiple Access (Wideband Code Division Multiple Access Wireless, WCDMA) system, a General Packet Radio Service (General Packet Radio Service, GPRS), Long Term Evolution (Long Term Evolution, LTE), a 5G communications system, or another system that may emerge in the future. The following describes some terms in this application, so as to be understood by a person skilled in the art. It should be noted that, when solutions in the embodiments of this application are applied to the 5G communications system or the another system that may emerge in the future, names of a network device and a terminal may change, but this does not affect implementation of the solutions in the embodiments of this application.

Figure 1:
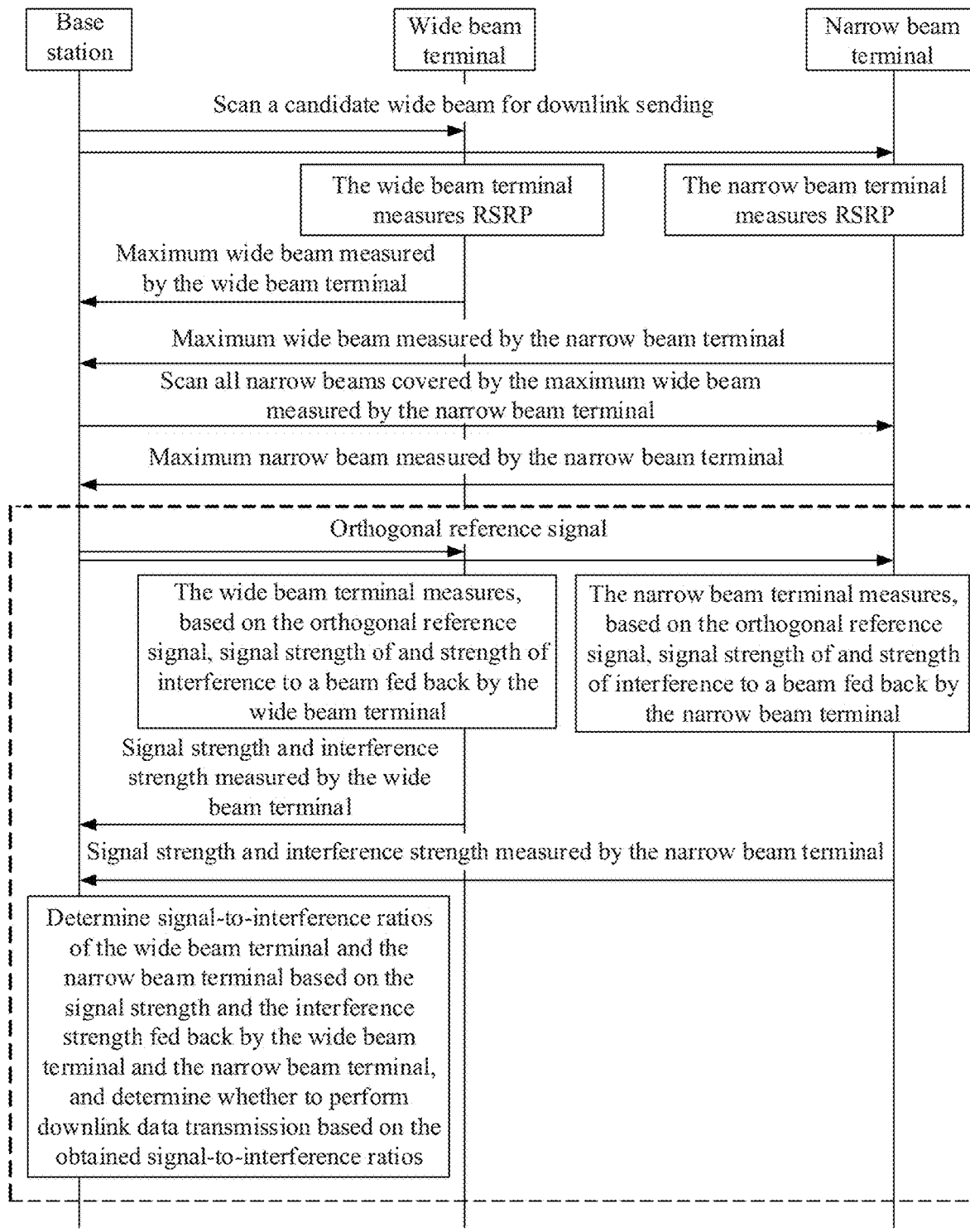
FIG. 1 is a schematic diagram of a downlink data transmission method according to the prior art.
Figure 2:
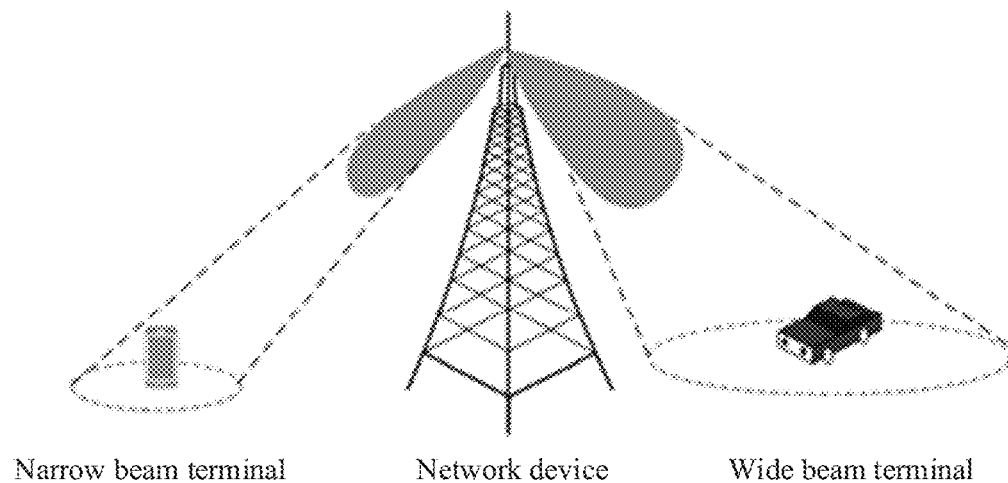
FIG. 2 is a schematic diagram of an application scenario according to an embodiment of this application.

FIG. 2 is a schematic diagram of an application scenario according to an embodiment of this application. The communications system may be a cellular mobile communications network system. The cellular mobile communications network system works in a high frequency band (frequency >6 GHz), and may include a network device and at least two terminal devices. The network device (for example, a base station) is equipped with an antenna array, and uses beamforming to generate a directional beam to perform downlink signal transmission. In addition, the network device can simultaneously transmit a plurality of beams at a same frequency to perform downlink multi-user MIMO transmission. For example, as shown in FIG. 2, the cellular mobile communications network system includes a network device, one wide beam terminal, and one narrow beam terminal. When the network device determines whether data can be simultaneously transmitted to the wide beam terminal and the narrow beam terminal, that is, when the network device determines whether the wide beam terminal and the narrow beam terminal can be simultaneously scheduled, the network device needs to send an orthogonal reference signal to the wide beam terminal and the narrow beam terminal, so that the wide beam terminal and the narrow beam terminal can separately measure, based on the orthogonal reference signal, signal strength of and strength of interference to a beam that is fed back by each of the wide beam terminal and the narrow beam terminal, and feed back the separately measured signal strength and interference strength to the network device. Therefore, the network device may determine signal-to-interference ratios of the wide beam terminal and the narrow beam terminal based on the fed back signal strength and interference strength, and determine, based on the obtained signal-to-interference ratios, whether to perform downlink data transmission. However, the orthogonal reference signal occupies a specific time-frequency resource, which causes relatively large overheads of interference measurement. In addition, it takes some time for the wide beam terminal and the narrow beam terminal to separately measure, based on the orthogonal reference signal, the signal strength of and the strength of the interference to the beam fed back by each of the wide beam terminal and the narrow beam terminal, and feed back the signal strength and the interference strength to the network device, thereby causing a relatively large delay of interference measurement.

(1) A terminal is also referred to as a terminal device or user equipment (User Equipment, UE), and is a device that provides a user with voice and/or data connectivity, for example, a handheld device, an in-vehicle device, or an Internet of Things device that has a wireless connection function. For example, common terminal devices include a mobile phone, a tablet computer, a notebook computer, a palmtop computer, a mobile Internet device (mobile internet device, MID), and a wearable device. For example, the wearable device includes a smartwatch, a smart hand, or a pedometer.

(2) A network device is also referred to as a radio access network (Radio Access Network, RAN) device, and is a device that connects a terminal device to a wireless network. The network device includes network devices of various communications standards, for example, including but not limited to a base station, an evolved NodeB (evolved NodeB, eNB), a radio network controller (radio network controller, RNC), a NodeB (NodeB, NB), a base station controller (Base Station Controller, BSC), a base transceiver station (Base Transceiver Station, BTS), a home network device (for example, a home evolved NodeB, or a home NodeB, HNB), and a baseband unit (BaseBand Unit, BBU).

The network device includes network devices of various frequency standards, for example, including but not limited to a low-frequency network device and a high-frequency network device.

(3) "A plurality of" means two or more, and another quantifier is similar to this. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

To resolve a problem that there are large overheads and a large delay of interference measurement in a process of transmitting downlink data in the prior art, the embodiments of this application provide a downlink data transmission method. In the method, first beam feedback information is received from a wide beam terminal. The first beam feedback information includes information about a first wide beam to be used by the wide beam terminal and information about M wide beams whose signal quality meets a first condition. Second beam feedback information is received from a narrow beam terminal. The second beam feedback information includes information about a second wide beam determined by the narrow beam terminal and information about N wide beams whose signal quality meets a second condition. Information about a first narrow beam to be used by the narrow beam terminal is received from the narrow beam terminal. The first narrow beam is a narrow beam that is covered by the second wide beam. In this way, whether to transmit downlink data to the wide beam terminal and the narrow beam terminal may be directly determined based on the first beam feedback information, the second beam feedback information, and the information about the first narrow beam. Compared with the prior art, no additional orthogonal reference signal needs to be sent to perform interference measurement, thereby reducing resource overheads caused by the reference signal, and reducing a delay caused by interference measurement.

Figure 3:
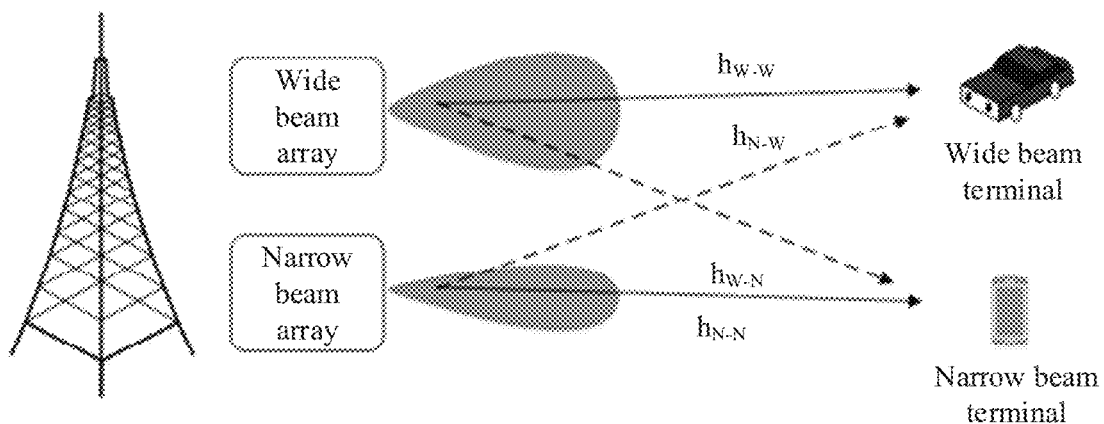
FIG. 3 is a schematic diagram of a scenario according to an embodiment of this application.
Figure 4:
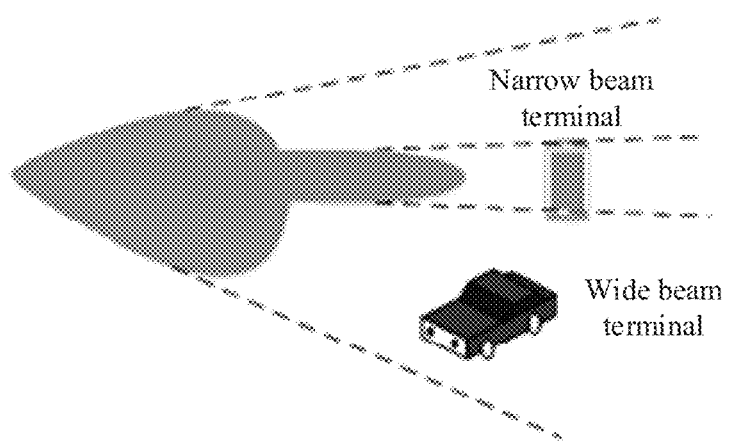
FIG. 4 is a schematic diagram of another scenario according to an embodiment of this application.

It should be noted that, in the embodiments of this application, when whether to transmit downlink data is being determined, transmission scenarios of the downlink data may be divided into two scenarios. In a first scenario, a wide beam to be used by the wide beam terminal and a narrow beam to be used by the narrow beam terminal do not overlap. FIG. 3 is a schematic diagram of a scenario according to an embodiment of this application. In a second scenario, a wide beam to be used by the wide beam terminal overlaps a narrow beam to be used by the narrow beam terminal. FIG. 4 is a schematic diagram of another scenario according to an embodiment of this application. Before the downlink data transmission method provided in the embodiments of this application is described, several names in the embodiments of this application are first explained. The wide beam terminal may be understood as a terminal that is using a wide beam or is about to use a wide beam. The narrow beam terminal may be understood as a terminal that is using a narrow beam or is about to use a narrow beam. A parent beam of a narrow beam may understand as follows: If the narrow beam is within coverage of a wide beam, the wide beam is a parent beam of the narrow beam. One narrow beam may correspond to one or more parent beams. The following describes the downlink data transmission method in the two different scenarios by using detailed embodiments.

Figure 5:
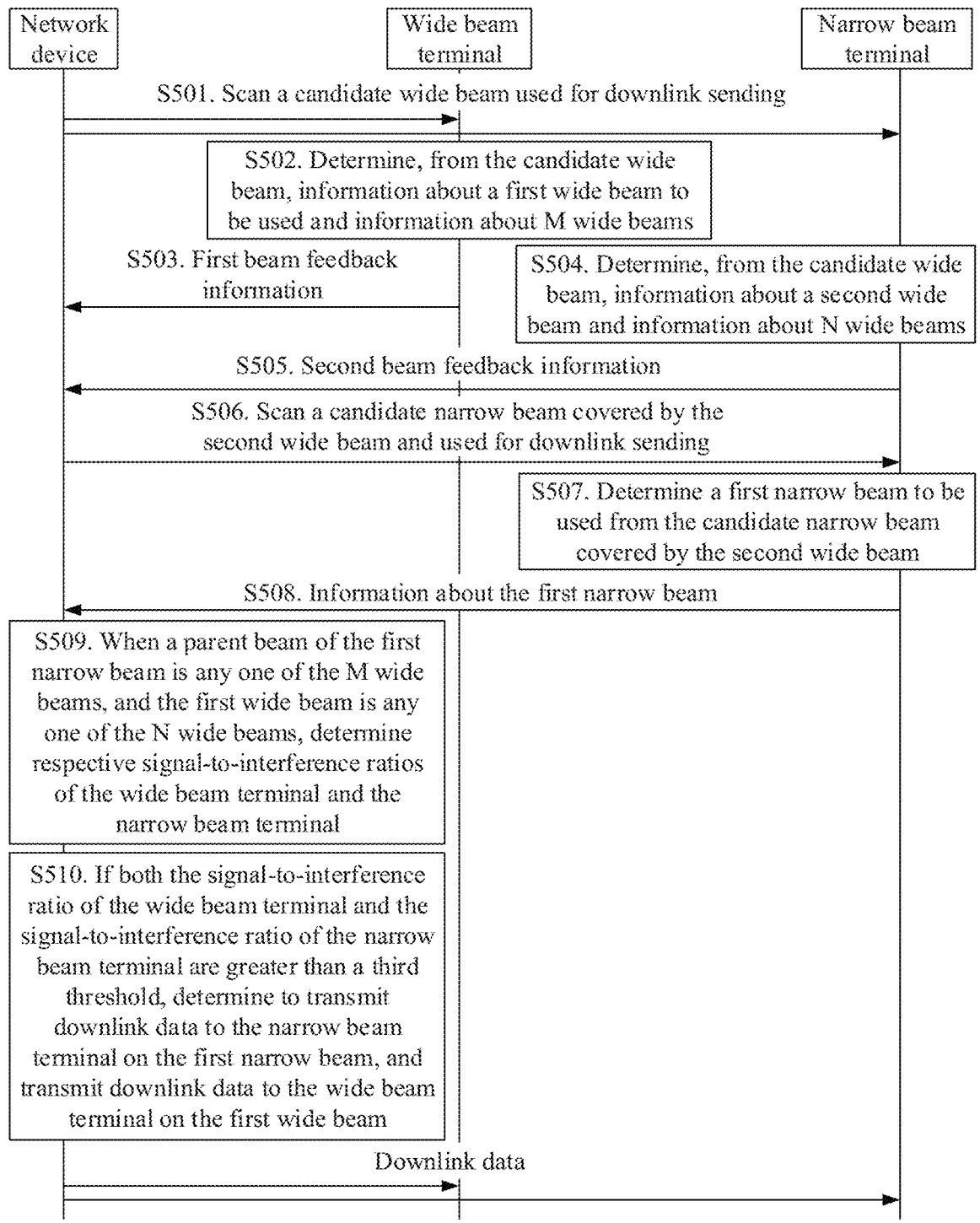
FIG. 5 is a schematic diagram of a downlink data transmission method according to an embodiment of this application.

In the first scenario, when the wide beam to be used by the wide beam terminal and the narrow beam to be used by the narrow beam terminal do not overlap, refer to FIG. 5. FIG. 5 is a schematic diagram of a downlink data transmission method according to an embodiment of this application. The downlink data transmission method may include the following steps:

S501. A network device scans a candidate wide beam used for downlink sending.

The candidate wide beam may be understood as a wide beam that is to be used by the network device for downlink sending. The network device scans the candidate wide beam to the wide beam terminal and the narrow beam terminal, so that the wide beam terminal and the narrow beam terminal measure the candidate wide beam, so as to perform the following S507-S505:

S502. The wide beam terminal determines, from the candidate wide beam, information about a first wide beam to be used by the wide beam terminal and information about M wide beams whose signal quality meets a first condition.

M is an integer greater than or equal to 1. Optionally, the M wide beams may be M wide beams with minimum signal quality in the candidate wide beam used for downlink sending. Alternatively, the M wide beams may be M wide beams whose signal quality is less than a first threshold in the candidate wide beam. It should be noted that the first wide beam may be understood as a wide beam to be used by the wide beam terminal. For example, the first wide beam may be a wide beam with maximum RSRP in all candidate wide beams measured by the wide beam terminal. For the wide beam terminal, the M wide beams determined by the wide beam terminal may be understood as M wide beams that less interfere with the first wide beam in the candidate wide beam. Optionally, the information about the first wide beam may include RSRP of the first wide beam, and certainly, may include ID information of the first wide beam, and the like. Similarly, information about each wide beam in the information about the M wide beams may also include RSRP of the wide beam, and certainly, may also include an ID of the wide beam.

After the network device scans the candidate wide beam used for downlink sending, the wide beam terminal may perform RSRP measurement on each of the candidate wide beam, so as to select a wide beam with maximum RSRP from the candidate wide beam, and determine the wide beam with the maximum RSRP as the first wide beam to be used by the wide beam terminal. In addition, M wide beams with minimum signal quality or M wide beams whose signal quality is less than the first threshold are further selected from the candidate wide beam, and are determined as the M wide beams that meet the first condition. The first threshold may be set based on an actual requirement. Herein, this embodiment of this application sets no further limitation on a specific value of the first threshold.

For example, in an initial access phase, it is assumed that candidate wide beams scanned by the network device and used for downlink sending are $\{f_1, \ldots, f_A\}$, and candidate receive wide beams of terminals (including the wide beam terminal and the narrow beam terminal) are $\{w_1, \ldots, w_B\}$. In the initial access phase of the wide beam, the wide beam terminal measures channel quality (usually represented by RSRP) corresponding to all candidate wide beams, so as to determine, from the candidate wide beams, the information about the first wide beam to be used by the wide beam terminal. When the M wide beams are selected, in a possible manner, when the M wide beams are M wide beams with minimum signal quality in the candidate wide beam, a condition for determining whether a wide beam belongs to the M wide beams may be expressed as:

$$|w_{opt}^T h f_i| \leq |w_{opt}^T h f_j|, \forall i \in \{k_1, \ldots, k_M\}, j \notin \{k_1, \ldots, k_M\}.$$

$w_{opt}$ represents the first wide beam selected by the wide beam terminal, h represents a channel matrix, $f_i$ represents an ith wide beam, $k_i$ represents an index of the ith wide beam, and $k_j$ represents an index of a jth wide beam. After the M wide beams with minimum signal quality are determined, ID information corresponding to the M wide beams and an RSRP value corresponding to each of the M wide beams may be further determined. For example, if M is equal to 1, the M wide beams herein may be wide beams with minimum RSRP.

In another possible manner, when the M wide beams are wide beams whose signal quality is less than the first threshold in the candidate wide beam, a condition for determining whether a wide beam belongs to the M wide beams may be expressed as:

$$|w_{opt}^T h f_i| \leq \text{first threshold, where } i \in \{k_1, \ldots, k_M\}.$$

Similarly, after the M wide beams with minimum signal quality are determined, ID information corresponding to the M wide beams and an RSRP value corresponding to each of the M wide beams may be further determined. It should be noted that the first threshold herein may be configured by the network device, and notified to the terminal on a broadcast channel.

S503, The wide beam terminal sends first beam feedback information to the network device.

The first beam feedback information includes the information about the first wide beam and the information about the M wide beams.

After determining, by using S502, the to-be-used first wide beam and the M wide beams that meet the first condition, the wide beam terminal sends, to the network device, the first beam feedback information that includes the information about the first wide beam and the information about the M wide beams, so that the network device receives the first beam feedback information, so as to obtain, based on the first beam feedback information, the information about the to-be-used first wide beam selected by the wide beam terminal and the information about the M wide beams.

S504. The narrow beam terminal determines, from the candidate wide beam, information about a second wide beam determined by the narrow beam terminal and information about N wide beams whose signal quality meets a second condition.

N is an integer greater than or equal to 1. Optionally, the N wide beams are N wide beams with minimum signal quality in the candidate wide beam. Alternatively, the N wide beams are N wide beams whose signal quality is less than a second threshold in the candidate wide beam. It should be noted that, for the narrow beam terminal, the second wide beam determined by the narrow beam terminal may be understood as a wide beam with maximum RSRP measured by the narrow beam terminal, that is, a wide beam with best signal quality. The N wide beams determined by the narrow beam terminal may be understood as M wide beams that less interfere with the second wide beam in the candidate wide beam. Optionally, the information about the second wide beam may include RSRP of the second wide beam, and certainly, may include ID information of the second wide beam, and the like. Similarly, information about each wide beam in the information about the N wide beams may also include RSRP of the wide beam, and certainly, may also include an ID of the wide beam.

After the network device scans the candidate wide beam used for downlink sending, the narrow beam terminal may perform RSRP measurement on each of the candidate wide beam, so as to select a wide beam with maximum RSRP from the candidate wide beam, and determine the wide beam with the maximum RSRP as the second wide beam. In addition, N wide beams with minimum signal quality or N wide beams whose signal quality is less than the first threshold are further selected from the candidate wide beam, and are determined as the N wide beams that meet the second condition. The second threshold may be set based on an actual requirement. Herein, this embodiment of this application sets no further limitation on a specific value of the second threshold.

It should be noted that in this embodiment of this application, a manner in which the narrow beam terminal determines the second wide beam and the N wide beams that meet the second condition is similar to a manner in which the wide beam terminal determines the first wide beam and the M wide beams that meet the first condition in S502. Reference may be made to related descriptions in which the wide beam terminal determines the first wide beam and the M wide beams that meet the first condition in S502. Details are not described herein again in this embodiment of this application.

S505. The narrow beam terminal sends second beam feedback information to the network device.

The second beam feedback information includes the information about the second wide beam and the information about the N wide beams.

After determining, by using S504, the second wide beam and the N wide beams that meet the second condition, the narrow beam terminal sends, to the network device, the second beam feedback information that includes the information about the second wide beam and the information about the N wide beams, so that the network device receives the second beam feedback information, so as to obtain the information about the second wide beam and the information about the N wide beams based on the second beam feedback information.

It should be noted that, in this embodiment of this application, there is no sequence between S502-S503 and S504-S505. After S501 is performed, S502-S503 may be performed before S504-S505. Alternatively, after S501 is performed, S504-S505 is performed before S502-S503. Certainly, after S501 is executed, S502-S503 and S504-S505 may be performed simultaneously. This embodiment of this application is merely described by using an example in which after S501 is performed, S502-S503 may be performed before S504-S505. However, this is not intended to indicate that this embodiment of this application is limited thereto.

After receiving the information about the second wide beam and the information about the N wide beams that meet the second condition that are sent by the narrow beam terminal, the network device may further perform the following S506:

S506. The network device scans a candidate narrow beam that is covered by the second wide beam and used for downlink sending.

The candidate narrow beam may be understood as a narrow beam to be used by the network device for downlink sending. The network device scans the candidate narrow beam to the narrow beam terminal, so that the narrow beam terminal can measure the candidate narrow beam that is covered by the second wide beam, so as to perform the following S507-S508:

S507. The narrow beam terminal determines a first narrow beam to be used by the narrow beam terminal from the candidate narrow beam that is covered by the second wide beam.

The first narrow beam may be understood as a narrow beam to be used by the narrow beam terminal. For example, the first narrow beam may be a narrow beam with maximum RSRP in all candidate narrow beams covered by the second wide beam and measured by the narrow beam terminal. Optionally, information about the first narrow beam may include RSRP of the first narrow beam, and certainly, may also include information such as an ID of the first narrow beam.

S508. The narrow beam terminal sends, to the network device, the information about the first narrow beam to be used by the narrow beam terminal.

After determining the information about the to-be-used first narrow beam by using S507, the narrow beam terminal sends the information about the first narrow beam to the network device, so that the information about the to-be-used first narrow beam is obtained.

After obtaining, by using S501-S508, the first beam feedback information sent by the wide beam terminal, the second beam feedback information, and the information about the first narrow beam, the network device may determine, based on the first beam feedback information, the second beam feedback information, and the information about the first narrow beam, whether to transmit downlink data to the wide beam terminal and the narrow beam terminal. When the wide beam to be used by the wide beam terminal and the narrow beam to be used by the narrow beam terminal do not overlap, the network device may specifically implement the following S509-S510:

S509. When a parent beam of the first narrow beam is any one of the M wide beams, and the first wide beam is any one of the N wide beams, the network device determines respective signal-to-interference ratios of the wide beam terminal and the narrow beam terminal.

When the parent beam of the first narrow beam is any one of the M wide beams, and the first wide beam is any one of the N wide beams, it indicates that the first wide beam to be used by the wide beam terminal and the first narrow beam to be used by the narrow beam terminal do not overlap. In this case, the network device may determine the respective signal-to-interference ratios of the wide beam terminal and the narrow beam terminal, and determine, based on the respective signal-to-interference ratios of the wide beam terminal and the narrow beam terminal, whether to transmit downlink data to the narrow beam terminal on the first narrow beam, and transmit downlink data to the wide beam terminal on the first wide beam.

Optionally, when determining the signal-to-interference ratio of the wide beam terminal, the network device may first determine a product of RSRP of the parent beam, of the first narrow beam, in the M wide beams and a parameter, where the parameter is a square of a maximum gain difference; and determine the signal-to-interference ratio of the wide beam terminal based on a ratio of the RSRP of the first wide beam to the product.

Specifically, the signal-to-interference ratio of the wide beam terminal may be determined by using $$SIR_w = \frac{RSRP^w_{f_w}}{RSRP^w_{f_{w(N)}} \times C^2},$$

where $SIR_w$ represents the signal-to-interference ratio of the wide beam terminal W-UE, $RSRP^w_{f_w}$ represents the RSRP corresponding to the first wide beam $f_w$ fed back by the wide beam terminal W-UE in the initial access phase of the wide beam, $RSRP^w_{f_{w(N)}}$ represents the RSRP corresponding to the parent beam $f_{w(N)}$, of the first narrow beam, in the M wide beams $\Omega_w$ fed back by the wide beam terminal W-UE in the initial access phase of the wide beam, and c represents the maximum gain difference between the wide beam and the narrow beam.

Optionally, when determining the signal-to-interference ratio of the narrow beam terminal, the network device may determine the signal-to-interference ratio of the narrow beam terminal based on a ratio of the RSRP of the first narrow beam to the RSRP of the first wide beam in the N wide beams.

Specifically, the signal-to-interference ratio of the narrow beam terminal may be determined by using $$SIR_N = \frac{RSRP^N_{f_N}}{RSRP^N_{f_w}},$$

where $SIR_N$ represents the signal-to-interference ratio of the narrow beam terminal, $RSRP^N_{f_N}$ represents RSRP corresponding to the first narrow beam $f_N$ fed back by the narrow beam terminal in a beam optimization phase, and $RSRP^N_{f_w}$ represents the RSRP corresponding to the first wide beam $f_w$ in the N wide beams $\Omega_N$ fed back by the narrow beam terminal.

S510. If both the signal-to-interference ratio of the wide beam terminal and the signal-to-interference ratio of the narrow beam terminal are greater than a third threshold, the network device determines to transmit downlink data to the narrow beam terminal on the first narrow beam, and transmit downlink data to the wide beam terminal on the first wide beam.

The third threshold may be set based on an actual requirement. Herein, a value of the third threshold is not further limited in this embodiment of this application.

After the signal-to-interference ratio of the wide beam terminal and the signal-to-interference ratio of the narrow beam terminal are separately determined by using S509, it may be determined whether the signal-to-interference ratio of the wide beam terminal and the signal-to-interference ratio of the narrow beam terminal are greater than the third threshold. If both the signal-to-interference ratio of the wide beam terminal and the signal-to-interference ratio of the narrow beam terminal are greater than the third threshold, it indicates that the first wide beam to be used by the wide beam terminal causes little interference to the first narrow beam to be used by the narrow beam terminal, and the first narrow beam to be used by the narrow beam terminal causes little interference to the first wide beam to be used by the wide beam terminal. In this case, the network device may simultaneously schedule the wide beam terminal and the narrow beam terminal, so as to transmit downlink data to the narrow beam terminal on the first narrow beam, and transmit downlink data to the wide beam terminal on the first wide beam.

It should be noted that a wide beam corresponding to minimum RSRP in the M-wide beam set $\Omega_w$ (a set including the M wide beams in the first beam feedback information) sent by the wide beam terminal to the network device is $f_w^1$, and a wide beam corresponding to minimum. RSRP in the N-wide beam set $\Omega_N$ (a set including the N wide beams in the second beam feedback information) sent by the narrow beam terminal to the network device is $f_{w(N)}^1$. Then, the network device may preferably schedule a wide beam terminal and a narrow beam terminal together that meet $f_w^1 = f_{w(N)}$ and $f_{w(N)}^1 = f_w$. In this case, signal-to-interference ratios of the scheduled wide beam terminal and narrow beam terminal are the maximum at the same time, so that downlink data is transmitted to the narrow beam terminal on the first narrow beam, and downlink data is transmitted to the wide beam terminal on the first wide beam.

After separately obtaining the first beam feedback information, the second beam feedback information, and the information about the first narrow beam by using S501-S508, when the parent beam of the first narrow beam is any one of the M wide beams, and the first wide beam is any one of the N wide beams, the network device determines the respective signal-to-interference ratios of the wide beam terminal and the narrow beam terminal; and if both the signal-to-interference ratio of the wide beam terminal and the signal-to-interference ratio of the narrow beam terminal are greater than the third threshold, determines to transmit downlink data to the narrow beam terminal on the first narrow beam, and transmit downlink data to the wide beam terminal on the first wide beam. It can be learned that in the downlink data transmission method provided in this embodiment of this application, whether to transmit downlink data to the wide beam terminal and the narrow beam terminal is determined directly based on the first beam feedback information, the second beam feedback information, and the information about the first narrow beam. Compared with the prior art, no additional orthogonal reference signal needs to be sent to perform interference measurement, thereby reducing resource overheads caused by the reference signal and reducing a delay caused by interference measurement.

In an actual application process, the technical solution shown in this embodiment of this application is used. For a single-cell NR system, a network device is equipped with two antenna arrays, where a wide beam antenna array is equipped with four antennas, and a narrow beam antenna array is equipped with 16 antennas, so as to be used for downlink multi-user AMMO transmission. For simplicity, a beamforming capability of a terminal may be ignored. A channel is a line-of-sight (Line-of-sight, LoS) channel at a probability of 80% or a non-line-of-sight (Non-line-of-sight, NLoS) channel at a probability of 20%. The two types of channels are generated by using the following model:

$$h^{LOS} = \sqrt{\beta}\left(\sqrt{\frac{K_R}{K_R+1}}\, e^{j\frac{2\pi}{\lambda}d\sin(\theta^{LOS})+j\phi^{LOS}} + \sum_{i=1}^{L}\sqrt{\frac{1}{K_R+1}}\, e^{j\frac{2\pi}{\lambda}d\sin(\theta_i^{NLOS})+j\phi_i^{NLOS}}\right)$$

and $$h^{LOS} = \sqrt{\beta}\sum_{i=1}^{L} e^{j\frac{2\pi}{\lambda}d\sin(\theta_i^{NLOS})+j\phi_i^{NLOS}}.$$

Figure 6:
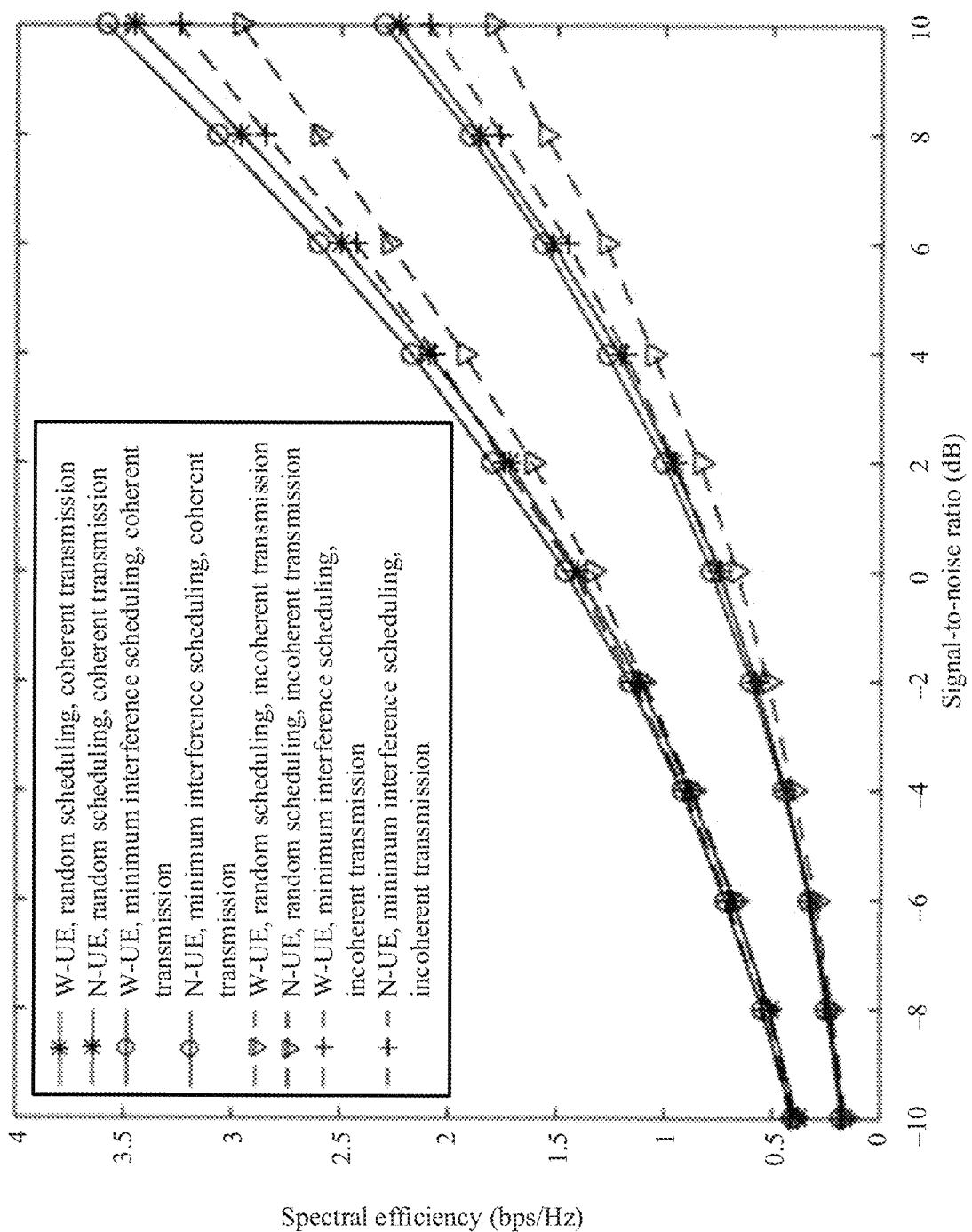
FIG. 6 is a relationship graph in which spectral efficiency of a wide beam terminal and a narrow beam terminal changes with a signal-to-noise ratio according to an embodiment of this application.

$h^{LOS}$ represents a channel in a case of line-of-sight, $h^{NLOS}$ represents a channel in a case of non-line-of-sight, $\beta$ represents a large-scale fading coefficient, $K_R$ represents a Rician channel K factor, $\theta$ represents a channel departure angle, and d represents an antenna distance vector. It is assumed that channel departure angles of the wide beam array and the narrow beam array are the same. For a change relationship between spectral efficiency of the wide beam terminal and the narrow beam terminal and a signal-to-noise ratio, refer to FIG. 6. FIG. 6 is a relationship graph in which spectral efficiency of the wide beam terminal and the narrow beam terminal changes with a signal-to-noise ratio according to an embodiment of this application. With reference to FIG. 6, it can be seen that two modes of coherent transmission and incoherent transmission are considered. According to the downlink data transmission method shown in this embodiment of this application, performance is improved compared with a random scheduling solution in the prior art, especially in an incoherent transmission mode.

In the downlink data transmission method provided in this embodiment of this application, the first beam feedback information is received from the wide beam terminal. The first beam feedback information includes the information about the first wide beam to be used by the wide beam terminal and the information about the M wide beams whose signal quality meets the first condition. The second beam feedback information is received from the narrow beam terminal. The second beam feedback information includes the information about the second wide beam determined by the narrow beam terminal and the information about the N wide beams whose signal quality meets the second condition. The information about the first narrow beam to be used by the narrow beam terminal is received from the narrow beam terminal. The first narrow beam is a narrow beam that is covered by the second wide beam. In this way, whether to transmit downlink data to the wide beam terminal and the narrow beam terminal may be directly determined based on the first beam feedback information, the second beam feedback information, and the information about the first narrow beam. Compared with the prior art, no additional orthogonal reference signal needs to be sent to perform interference measurement, thereby reducing resource overheads caused by the reference signal, and reducing a delay caused by interference measurement.

Figure 7:
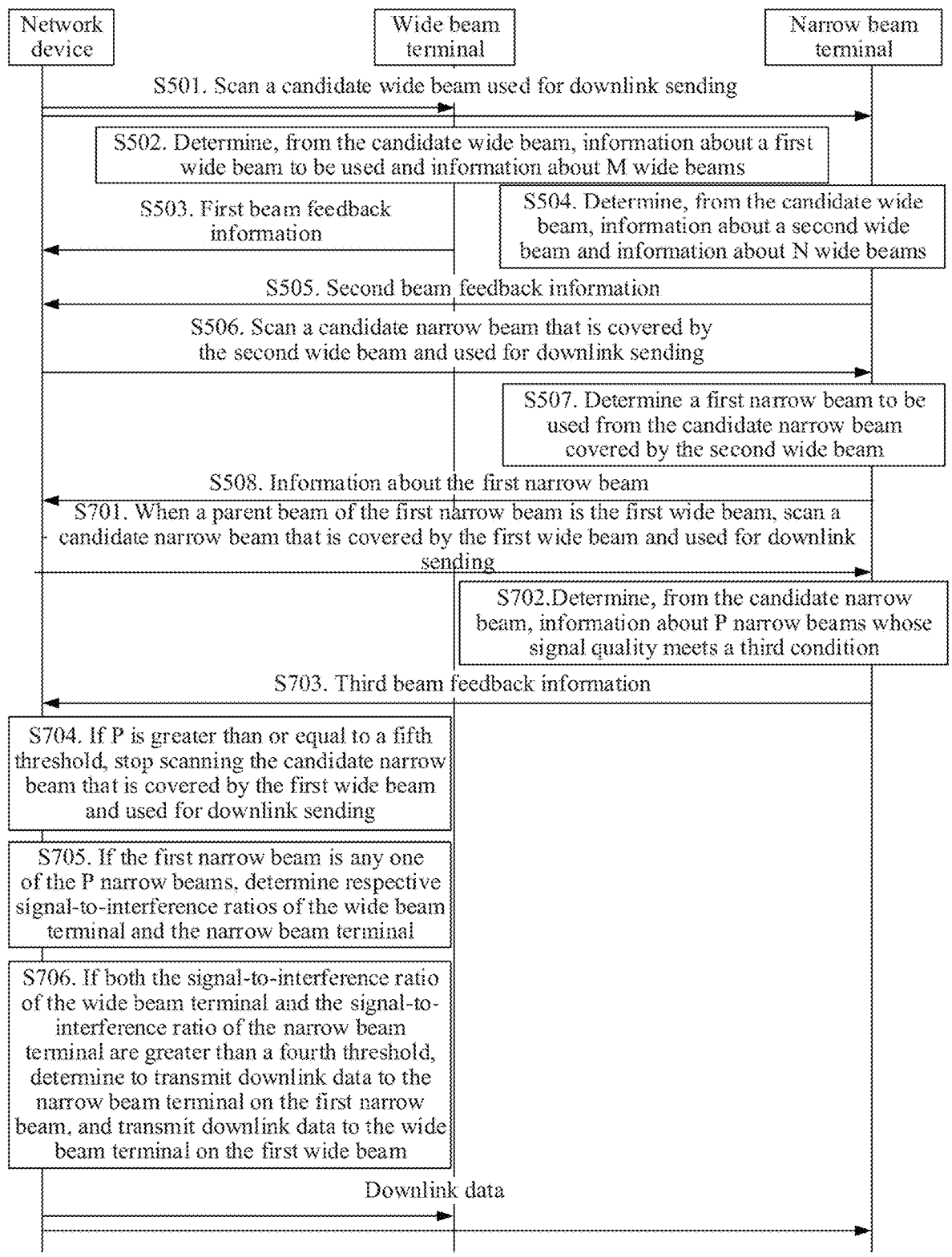
FIG. 7 is a schematic diagram of another downlink data transmission method according to an embodiment of this application.

The foregoing embodiment shown in FIG. 5 describes in detail the technical solution for determining whether to transmit downlink data to the wide beam terminal and the narrow beam terminal in the first scenario when the wide beam to be used by the wide beam terminal and the narrow beam to be used by the narrow beam terminal do not overlap. It should be noted that, in the foregoing embodiment shown in FIG. 5, after S508 is completed, that is, after the network device obtains the first beam feedback information sent by the wide beam terminal, the second beam feedback information, and the information about the first narrow beam, the network device may determine, based on the first beam feedback information, the second beam feedback information, and the information about the first narrow beam, whether to transmit downlink data to the wide beam terminal and the narrow beam terminal. When the parent beam of the first narrow beam is any one of the M wide beams, and the first wide beam is any one of the N wide beams, it indicates that the first wide beam and the first narrow beam do not overlap, and S509-S510 may be performed to determine, based on the respective signal-to-interference ratios of the wide beam terminal and the narrow beam terminal, whether to transmit downlink data to the wide beam terminal and the narrow beam terminal. On the contrary, when the parent beam of the first narrow beam is not any one of the M wide beams, and the parent beam of the first narrow beam is the first wide beam, it indicates that the first wide beam and the first narrow beam overlap. That is, the second scenario in the embodiment of this application occurs. With reference to FIG. 4, in the second scenario, when the wide beam to be used by the wide beam terminal and the narrow beam to be used by the narrow beam terminal overlap, refer to FIG. 7 for the technical solution about how to determine whether to transmit downlink data to the wide beam terminal and the narrow beam terminal. FIG. 7 is a schematic diagram of another downlink data transmission method according to an embodiment of this application. The downlink data transmission method may include the following steps.

S701. When a parent beam of a first narrow beam is a first wide beam, a network device scans a candidate narrow beam that is covered by the first wide beam and used for downlink sending.

The candidate narrow beam is sent by the network device when determining that the parent beam of the first narrow beam to be used by a narrow beam terminal is the first wide beam. The candidate narrow beam may be understood as a narrow beam to be used by the network device for downlink sending.

When the parent beam of the first narrow beam is the first wide beam, it indicates that the first wide beam to be used by a wide beam and the first narrow beam to be used by the narrow beam terminal overlap. In this case, the network device may further scan the candidate narrow beam that is covered by the first wide beam for the wide beam terminal, so that the wide beam terminal may measure each narrow beam of the candidate narrow beam that is covered by the first wide beam, and therefore perform the following S702-S703.

S702, The wide beam terminal determines, from the candidate narrow beam, information about P narrow beams whose signal quality meets a third condition.

P is an integer greater than or equal to 1. Optionally, the P narrow beams are P narrow beams whose signal quality is less than the third threshold in the candidate narrow beam that is covered by the first wide beam and used for downlink sending. The third threshold may be set based on an actual requirement. Herein, this embodiment of this application sets no further limitation on a specific value of the third threshold.

For example, when determining the P narrow beams, the wide beam terminal may measure channel quality $|w_w^T h_{N-w} f_N|$, where $w_w^T$ represents a receive beam of the wide beam terminal, and $h_{N-w}$ represents a channel send by the network device to the wide beam terminal by using the narrow beam. If channel quality of a narrow beam is less than the third threshold, the wide beam terminal determines that the narrow beam is one of the P narrow beams. In this way, the wide beam terminal determines the P narrow beams whose signal quality is less than the third threshold. After the P narrow beams whose signal quality is less than the third threshold are determined, IDs corresponding to the P narrow beams and an RSRP value corresponding to each narrow beam of the P narrow beams may be further determined. Optionally, information about each narrow beam in the information about the P narrow beams that meet the third condition may also include RSRP of the narrow beam, and certainly, may also include an ID of the narrow beam. For example, if P is equal to 1, the P wide beams herein may be a narrow beam with minimum RSRP.

S703. The wide beam terminal sends a third beam feedback message to the network device.

The third beam feedback message includes the information about the P narrow beams.

After determining, by using S703, the information about the P narrow beams whose signal quality meets the third condition in the candidate narrow beam, the narrow beam terminal sends, to the network device, the third feedback information that includes the information about the P narrow beams that meet the third condition, so that the network device receives the third beam feedback information, and obtains, based on the third beam feedback information, the information about the P narrow beams determined by the wide beam terminal.

S704. If P is greater than or equal to a fifth threshold, the network device stops scanning the candidate narrow beam that is covered by the first wide beam and used for downlink sending.

The fifth threshold may be set based on an actual requirement. Herein, a size of the fifth threshold is not further limited in this embodiment of this application. It should be noted that in this embodiment of this application, when the fifth threshold is 1, scanning stops after the wide beam terminal measures any narrow beam whose RSRP is less than the specified threshold.

After receiving the third feedback information that is sent by the narrow beam terminal and that includes the information about the P narrow beams that meet the third condition, the network device determines whether P is greater than or equal to the fifth threshold, and if P is greater than or equal to the fifth threshold, stops scanning the candidate narrow beam that is covered by the first wide beam and used for downlink sending, and performs the following S705:

S705, if the first narrow beam is any one of the P narrow beams, the network device determines respective signal-to-interference ratios of the wide beam terminal and the narrow beam terminal.

When the first narrow beam is any narrow beam of the P narrow beams determined by the wide beam terminal, it indicates that although the first wide beam to be used by the wide beam terminal and the first narrow beam to be used by the narrow beam terminal overlap, the network device may still determine the respective signal-to-interference ratios of the wide beam terminal and the narrow beam terminal, and determine, based on the respective signal-to-interference ratios of the wide beam terminal and the narrow beam terminal, whether to transmit downlink data to the narrow beam terminal on the first narrow beam, and transmit downlink data to the wide beam terminal on the first wide beam.

Optionally, when determining the signal-to-interference ratio of the wide beam terminal, the network device may determine the signal-to-interference ratio of the wide beam terminal based on a ratio of RSRP of the first wide beam to RSRP of the first narrow beam in the P wide beams. Specifically, the signal-to-interference ratio of the wide beam terminal may be determined by using $$SIR_w = \frac{RSRP_{f_w}^w}{RSRP_{f_N}^w},$$

where $SIR_w$ represents the signal-to-interference ratio of the wide beam terminal W-UE, $RSRP_{f_w}^w$ represents RSRP of the first wide beam $f_w$ fed back by the wide beam terminal W-UE in the initial phase of the wide beam, and $RSRP_{f_N}^w$ represents RSRP of the first narrow beam $f_N$ in the P narrow beams fed back by the wide beam terminal W-UE in the narrow beam measurement phase.

Optionally, when determining the signal-to-interference ratio of the narrow beam terminal, the network device may determine the signal-to-interference ratio of the narrow beam terminal based on a ratio of the RSRP of the first narrow beam to the RSRP of the first wide beam in the N wide beams. Specifically, because the parent beam $f_{W(N)}$ of the N-UE is the same as the wide beam $f_w$ of the W-UE in the overlapping scenario, the signal-to-interference ratio of the narrow beam terminal may be determined by using $$SIR_N = \frac{RSRP_{f_N}^N}{RSRP_{f_{w(N)}}^N},$$

where $SIR_N$ represents the signal-to-interference ratio of the narrow beam terminal, $RSRP_{f_{w(N)}}^N$ represents RSRP corresponding to the first wide beam $f_{W(N)}$ in the N wide beams fed back by the narrow beam terminal N-UE in the initial access phase of the wide beam, and $RSRP_{f_N}^N$ represents RSRP corresponding to the first narrow beam $f_N$ fed back by the narrow beam terminal N-UE the narrow beam optimization phase. It should be noted that in the overlapping scenario, the signal-to-interference ratio of the N-UE is relatively stable, and is approximately equal to a gain difference between the narrow beam and the wide beam.

It should be noted that if the first narrow beam is not any one of the P pieces of narrow beam, the terminal cannot determine an interference situation of the first narrow beam to the wide beam terminal, and therefore cannot calculate the signal-to-interference ratio of the wide beam terminal, Therefore, the network device determines not to transmit downlink data to the narrow beam terminal on the first narrow beam, and not to transmit downlink data to the wide beam terminal on the first wide beam.

S706. If both the signal-to-interference ratio of the wide beam terminal and the signal-to-interference ratio of the narrow beam terminal are greater than a fourth threshold, determine to transmit downlink data to the narrow beam terminal on the first narrow beam, and transmit downlink data to the wide beam terminal on the first wide beam.

The fourth threshold may be set based on an actual requirement. Herein, a size of the fourth threshold is not further limited in this embodiment of this application.

After the signal-to-interference ratio of the wide beam terminal and the signal-to-interference ratio of the narrow beam terminal are separately determined by using S705, it may be determined whether the signal-to-interference ratio of the wide beam terminal and the signal-to-interference ratio of the narrow beam terminal are greater than the fourth threshold. If both the signal-to-interference ratio of the wide beam terminal and the signal-to-interference ratio of the narrow beam terminal are greater than the fourth threshold, it indicates that the first wide beam to be used by the wide beam terminal causes little interference to the first narrow beam to be used by the narrow beam terminal, and the first narrow beam to be used by the narrow beam terminal causes little interference to the first wide beam to be used by the wide beam terminal. In this case, the network device may simultaneously schedule the wide beam terminal and the narrow beam terminal, so as to transmit downlink data to the narrow beam terminal on the first narrow beam, and transmit downlink data to the wide beam terminal on the first wide beam.

It should be noted that in the overlapping scenario, a narrow beam corresponding to minimum RSRP in the P narrow beams $\Omega_{N(W)}$ (a set including the P narrow beams in the third beam feedback information) sent by the wide beam terminal to the network device is $f_{N(W)}^1$, the network device may preferably schedule a wide beam terminal and a narrow beam terminal together that meet $f_{N(W)}^1 = f_N$. In this case, signal-to-interference ratios of the scheduled wide beam terminal and narrow beam terminal reach the maximum at the same time, so as to transmit downlink data to the narrow beam terminal on the first narrow beam and transmit downlink data to the wide beam terminal on the first wide beam.

Figure 8:
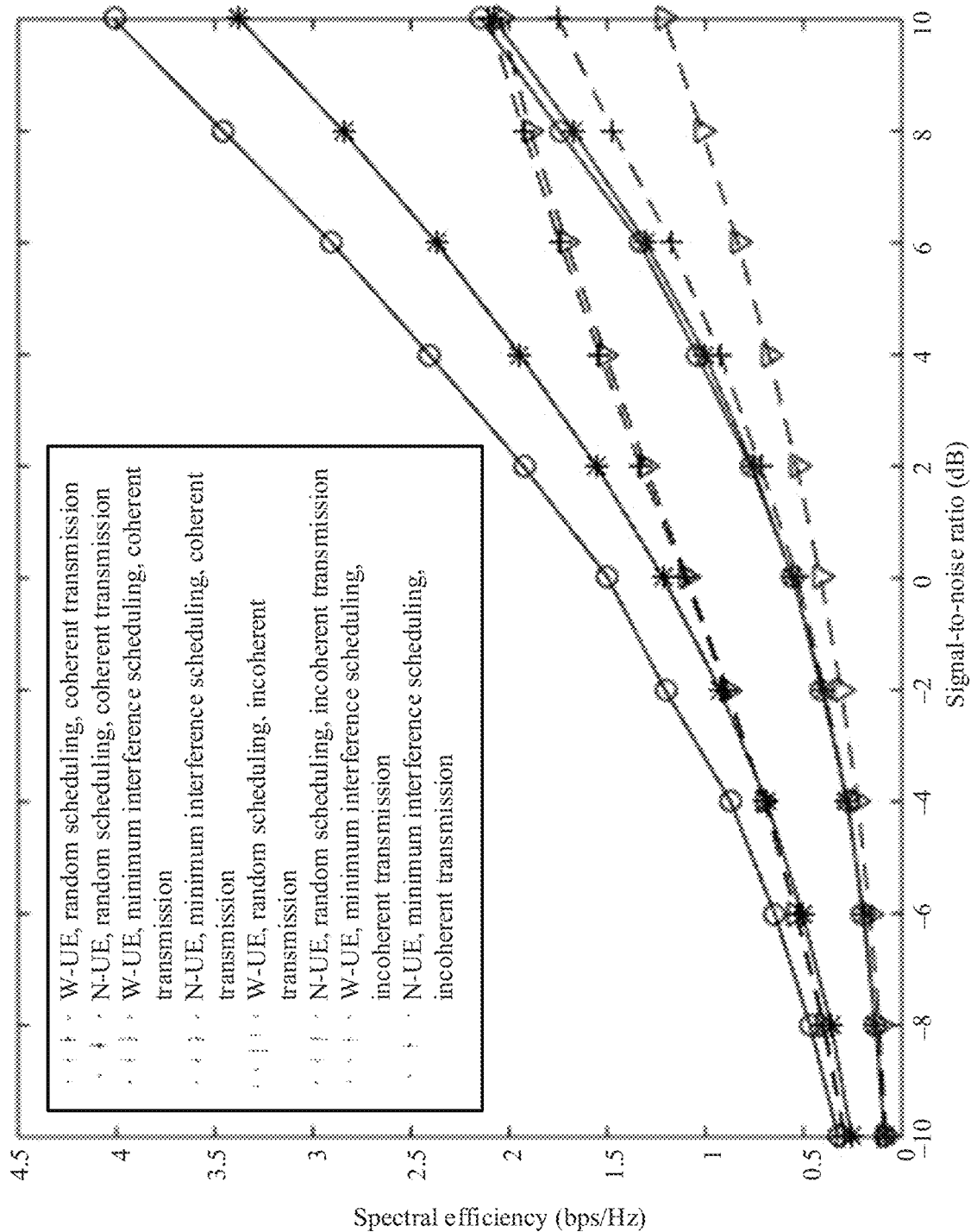
FIG. 8 is another relationship graph in which spectral efficiency of a wide beam terminal and a narrow beam terminal changes with a signal-to-noise ratio according to an embodiment of this application.

In an actual overlapping scenario, also for a single-cell NR system, a network device is equipped with two antenna arrays, where a wide beam antenna array is equipped with four antennas, and a narrow beam antenna array is equipped with 16 antennas for downlink multi-user MIMO transmission. For simplicity, a beamforming capability of a terminal may be ignored. A channel is a line-of-sight (Line-of-sight, LoS) channel at a probability of 80% or a non-line-of-sight (Non-line-of-sight, NLoS) channel at a probability of 20%. It is assumed that channel departure angles of the wide beam array and the narrow beam array are the same. For a change relationship between spectral efficiency of the wide beam terminal and the narrow beam terminal and a signal-to-noise ratio, refer to FIG. 8. FIG. 8 is another relationship graph in which spectral efficiency of the wide beam terminal and the narrow beam terminal changes with a signal-to-noise ratio according to an embodiment of this application. With reference to FIG. 8, it can be seen that two modes of coherent transmission and incoherent transmission are considered. According to the downlink data transmission method shown in this embodiment of this application, performance is significantly improved compared with a random scheduling solution in the prior art. This indicates that interference between terminals can be effectively reduced, and the signal-to-interference ratio of the terminal can be increased in the technical solution in this embodiment of this application.

It can be learned that, in the downlink data transmission method provided in this embodiment of this application, in the overlapping scenario, the candidate narrow beam is further scanned for the wide beam terminal, so that the wide beam terminal measures and feeds back the P narrow beams that meet the third condition. In this way, the network device may calculate signal-to-interference ratios of to-be-scheduled wide beam and narrow beam terminal based on the third beam feedback information fed hack by the wide beam, the second beam feedback information fed back by the narrow beam, and the information about the first narrow beam, and determine, based on the calculated signal-to-interference ratios, whether to transmit downlink data to the wide beam terminal and the narrow beam terminal. Compared with the prior art, no additional orthogonal reference signal needs to be sent to perform interference measurement, and only the wide beam terminal needs to perform beam scanning to measure a narrow beam with relatively small RSRP, thereby reducing resource overheads caused by the reference signal and reducing a delay caused by interference measurement.

After the technical solutions of this application are described in detail, to better understand the downlink data transmission method provided in the embodiments of this application, the following uses an example to describe the technical methods of the embodiments of this application.

During downlink data transmission, it is assumed that there are two wide beam terminals and two narrow beam terminals. Certainly, that there are only two wide beam terminals and two narrow beam terminals are only used as an example for description, and this embodiment of this application is not limited to this case. A network device first scans candidate wide beams used for downlink sending. The candidate wide beams are respectively a wide beam 1, a wide beam 2, a wide beam 3, a wide beam 4, and a wide beam 5, After measuring these candidate wide beams, a wide beam terminal 1 determines the wide beam 1 with maximum measured RSRP as a to-be-used first wide beam, determines the wide beam 2 and the wide beam 3 with smaller RSRP as two wide beams that meet a first condition, and sends first beam feedback information to the network device. The first beam feedback information may include RSRP of the wide beam 1, an ID of the wide beam 1, RSRP of the wide beam 2, an ID of the wide beam 2, RSRP of the wide beam 3, and an ID of the wide beam 3. After measuring these candidate wide beams, the wide beam terminal 2 also determines the wide beam 2 with maximum RSRP as a to-be-used first wide beam, determines the wide beam 1 and the wide beam 4 with smaller RSRP as two wide beams that meet the first condition, and sends first beam feedback information to the network device. The first beam feedback information may include RSRP of the wide beam 2, the ID of the wide beam 2, RSRP of the wide beam 1, an ID of the wide beam 1, RSRP of the wide beam 4, and an ID of the wide beam 4. After measuring these candidate wide beams, the narrow beam terminal 1 determines the wide beam 1 with maximum measured. RSRP as a second wide beam, determines the wide beam 3 with smaller RSRP as a wide beam that meets the first condition, and sends second beam feedback information to the network device. The second beam feedback information may include RSRP of the wide beam 1, the ID of the wide beam 1, RSRP of the wide beam 3, and the ID of the wide beam 3. After receiving the second beam feedback information fed back by the narrow beam terminal 1, the network device scans candidate narrow beams covered by the wide beam 1 and used for downlink sending. These candidate narrow beams are respectively a narrow beam 11, a narrow beam 12, a narrow beam 13, and a narrow beam 14. After measuring these candidate narrow beams, the narrow beam terminal 1 determines the narrow beam 12 with maximum measured RSRP as a to-be-used first narrow beam, and sends RSRP of the first narrow beam 12 and an ID of the first narrow beam 12 to the network device. After measuring these candidate wide beams, the narrow beam terminal 2 determines the wide beam 4 with maximum measured RSRP as a second wide beam, determines the wide beam 1 and the wide beam 2 with smaller RSRP as two wide beams that meet the first condition, and sends second beam feedback information to the network device. The second beam feedback information may include RSRP of the wide beam 4, the ID of the wide beam 4, RSRP of the wide beam 1, the ID of the wide beam 1, RSRP of the wide beam 2, and the ID of the wide beam 2. After receiving the second beam feedback information fed back by the narrow beam terminal 2, the network device scans candidate narrow beams covered by the wide beam 4 and used for downlink sending. The candidate narrow beams are respectively a narrow beam 41, a narrow beam 42, a narrow beam 43, and a narrow beam 44. After measuring these candidate narrow beams, the narrow beam terminal 4 determines the narrow beam 42 with maximum measured RSRP as a to-be-used first narrow beam, and sends RSRP of the first narrow beam 42 and an ID of the first narrow beam 42 to the network device.

After receiving the foregoing information fed back by the wide beam terminal 1, the wide beam terminal 2, the narrow beam terminal 1, and the narrow beam terminal 2, the network device combines every two of the wide beam terminal 1, the wide beam terminal 2, the narrow beam terminal 1, and the narrow beam terminal 2, and determines whether signal-to-interference ratios of two terminals in the combination meet a condition, so as to determine whether the two terminals can be simultaneously scheduled. A first combination is the wide beam terminal 1 and the narrow beam terminal 1, a second combination is the wide beam terminal 1 and the narrow beam terminal 2, a third combination is the wide beam 2 and the narrow beam 1, and a fourth combination is the wide beam 2 and the narrow beam 2. Specifically, for the second combination, it may be learned that, if the wide beam 1 to be used by the wide beam terminal 1 is one of the wide beams that meet the second condition and that are fed back by the narrow beam terminal 2, it may be determined that interference caused by the narrow beam 42 to be used by the narrow beam terminal 2 to the wide beam terminal 1 is relatively small. However, a parent beam, the wide beam 4, of the narrow beam 42 to be used by the narrow beam terminal 2 is not one of the wide beams that meet the first condition and that are fed back by the wide beam terminal 1, and interference caused by the wide beam 1 to be used by the wide beam terminal 1 to the narrow beam 42 to be used by the narrow beam terminal 2 cannot be determined. Therefore, respective signal-to-interference ratios of the wide beam terminal 1 and the narrow beam terminal 2 cannot be calculated, and whether the wide beam terminal 1 and the narrow beam terminal 2 can be simultaneously scheduled cannot be determined.

For the third combination, it may be learned that, if a parent beam, the wide beam 1, of the narrow beam 12 to be used by the narrow beam terminal 1 is one of the wide beams that meet the first condition and that are fed back by the wide beam terminal 2, it may be determined that interference caused by the wide beam 2 to be used by the wide beam terminal 2 to the narrow beam 12 to be used by the narrow beam terminal 1 is relatively small. However, the wide beam 2 to be used by the wide beam terminal 2 is not one of the wide beams that meet the second condition and that are fed back by the narrow beam terminal 1, and interference caused by the narrow beam 42 to be used by the narrow beam terminal 1 to the wide beam 2 to be used by the wide beam terminal 2 cannot be determined. Therefore, respective signal-to-interference ratios of the wide beam terminal 2 and the narrow beam terminal 1 cannot be calculated, and whether the wide beam terminal 2 and the narrow beam terminal 1 can be simultaneously scheduled cannot be determined.

For the fourth combination, it may be learned that, the wide beam 2 to be used by the wide beam terminal 2 is one of the wide beams that meet the second condition and that are fed back by the narrow beam terminal 2, and it may be determined that interference caused by the wide beam 2 to be used by the wide beam terminal 2 to the narrow beam 42 to be used by the narrow beam terminal 2 is relatively small. In addition, the parent beam, the wide beam 4, of the narrow beam 42 to be used by the narrow beam terminal 2 is one of the wide beams that meet the first condition and that are fed back by the wide beam terminal 2, and it may be determined that interference caused by the narrow beam 42 to be used by the narrow beam terminal 2 to the wide beam 2 to be used by the wide beam terminal 2 is relatively small. In this case, respective signal-to-interference ratios of the wide beam terminal 2 and the narrow beam terminal 2 may be calculated. If the respective signal-to-interference ratios of the wide beam terminal 2 and the narrow beam terminal 2 are greater than a third threshold, it is determined that the wide beam terminal 2 and the narrow beam terminal 2 can be simultaneously scheduled. That is, downlink data may be transmitted to the wide beam terminal 2 on the wide beam 2, and downlink data may be transmitted to the narrow beam terminal 2 on the narrow beam 42. Compared with the prior art, no additional orthogonal reference signal needs to be sent to perform interference measurement, thereby reducing resource overheads caused by the reference signal, and reducing a delay caused by interference measurement.

For the first combination, it may be learned that a parent beam of the narrow beam 12 to be used by the narrow beam terminal 1 is the wide beam 1, that is, the parent beam of the narrow beam 12 to be used by the narrow beam terminal 1 is the wide beam 1 to be used by the wide beam terminal 1, Then, it is determined that the narrow beam 12 to be used by the narrow beam terminal 1 and the wide beam 1 to be used by the wide beam terminal 1 overlap. In this case, the network device may further scan candidate narrow beams covered by the wide beam 1 and used for downlink sending. The candidate narrow beams are respectively the narrow beam 11, the narrow beam 12, the narrow beam 13, and the narrow beam 14. After measuring these candidate narrow beams, the narrow beam terminal 1 determines three narrow beams with relatively small signal quality as P narrow beams that meet a third condition, where the three narrow beams are respectively the narrow beam 12, the narrow beam 13, and the narrow beam 14; and sends third beam feedback information to the network device. The third beam feedback information may include the RSRP of the narrow beam 12, the ID of the narrow beam 12, the RSRP of the narrow beam 13, the ID of the narrow beam 13, the RSRP of the narrow beam 14, and the ID of the narrow beam 14. After receiving the third beam feedback information fed back by the narrow beam terminal 1, the network device may determine that the narrow beam 12 to be used by the narrow beam terminal 1 is one of the three narrow beams that meet the third condition and that are fed back by the wide beam terminal 1. It indicates that although the narrow beam 12 to be used by the narrow beam terminal 1 overlaps the wide beam 1 to be used by the wide beam terminal 1, the narrow beam 12 to be used by the narrow beam terminal 1 has little interference to the wide beam 1 to be used by the wide beam terminal 1, in this case, respective signal-to-interference ratios of the wide-beam terminal 1 and the narrow-beam terminal 1 may be calculated. If the respective signal-to-interference ratios of the wide beam terminal 1 and the narrow beam terminal 1 are greater than a fourth threshold, it is determined that the wide beam terminal 1 and the narrow beam terminal 1 can be simultaneously scheduled. That is, downlink data may be transmitted to the wide beam terminal 1 on the wide beam and downlink data may be transmitted to the narrow beam terminal 1 on the narrow beam 12. Compared with the prior art, no additional orthogonal reference signal needs to be sent to perform interference measurement, thereby reducing resource overheads caused by the reference signal, and reducing a delay caused by interference measurement.

Figure 9:
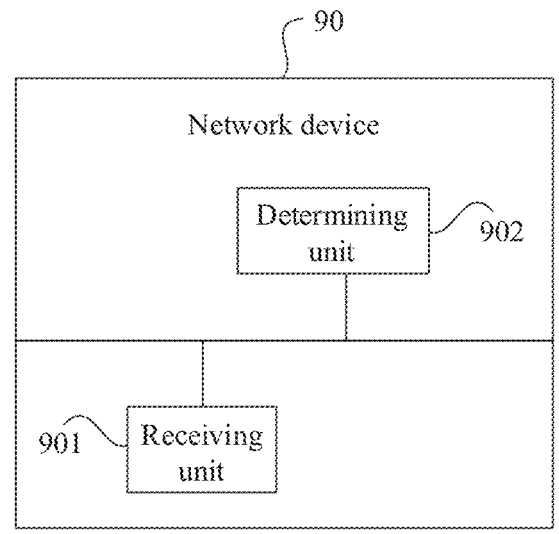
FIG. 9 is a schematic structural diagram of a network device according to an embodiment of this application.

FIG. 9 is a schematic structural diagram of a network device 90 according to an embodiment of this application. As shown in FIG. 9, the network device 90 may include:

a receiving unit 901, configured to: receive first beam feedback information from a wide beam terminal, where the first beam feedback information includes information about a first wide beam to be used by the wide beam terminal and information about M wide beams whose signal quality meets a first condition, and M is an integer greater than or equal to 1, where the receiving unit 901 is further configured to receive second beam feedback information from a narrow beam terminal, where the second beam feedback information includes information about a second wide beam determined by the narrow beam terminal and information about N wide beams whose signal quality meets a second condition, and N is an integer greater than or equal to 1; and the receiving unit 901 is further configured to receive, from the narrow beam terminal, information about a first narrow beam to be used by the narrow beam terminal, where the first narrow beam is a narrow beam covered by the second wide beam; and a determining unit 902, configured to determine, based on the first beam feedback information, the second beam feedback information, and the information about the first narrow beam, whether to transmit downlink data to the wide beam terminal and the narrow beam terminal.

Optionally, the M wide beams are M wide beams with minimum signal quality in a candidate wide beam used for downlink sending. Alternatively, the M wide beams are M wide beams whose signal quality is less than a first threshold in a candidate wide beam.

The N wide beams are N wide beams with minimum signal quality in the candidate wide beam. Alternatively, the N wide beams are N wide beams whose signal quality is less than a second threshold in the candidate wide beam.

Optionally, the determining unit 902 is specifically configured to: when a parent beam of the first narrow beam is any one of the M wide beams, and the first wide beam is any one of the N wide beams, determine respective signal-to-interference ratios of the wide beam terminal and the narrow beam terminal; and if both the signal-to-interference ratio of the wide beam terminal and the signal-to-interference ratio of the narrow beam terminal are greater than a third threshold, determine to transmit downlink data to the narrow beam terminal on the first narrow beam, and transmit downlink data to the wide beam terminal on the first wide beam.

Optionally, the information about the first wide beam includes reference signal received power RSRP of the first wide beam, and the information about the first narrow beam includes RSRP of the first narrow beam. The determining unit 902 is specifically configured to: determine a product of RSRP of the parent beam, of the first narrow beam, in the M wide beams and a parameter, where the parameter is a square of a maximum gain difference; and determine the signal-to-interference ratio of the wide beam terminal based on a ratio of the RSRP of the first wide beam to the product.

The determining unit 902 is further specifically configured to determine the signal-to-interference ratio of the narrow beam terminal based on a ratio of the RSRP of the first narrow beam to the RSRP of the first wide beam in the N wide beams.

Optionally, the determining unit 902 is specifically configured to: when a parent beam of the first narrow beam is the first wide beam, receive a third beam feedback message from the wide beam terminal, where the third beam feedback message includes information about P narrow beams whose signal quality meets a third condition, and P is an integer greater than or equal to 1; and determine, based on the first narrow beam and the third beam feedback message, whether to transmit downlink data to the narrow beam terminal on the first narrow beam, and transmit downlink data to the wide beam terminal on the first wide beam.

Optionally, the P narrow beams are P narrow beams whose signal quality is less than the third threshold in a candidate narrow beam that is covered by the first wide beam and used for downlink sending.

Optionally, the determining unit 902 is specifically configured to: if the first narrow beam is any one of the P narrow beams, determine respective signal-to-interference ratios of the wide beam terminal and the narrow beam terminal; and if both the signal-to-interference ratio of the wide beam terminal and the signal-to-interference ratio of the narrow beam terminal are greater than a fourth threshold, determine to transmit downlink data to the narrow beam terminal on the first narrow beam, and transmit downlink data to the wide beam terminal on the first wide beam.

Optionally, the information about the first wide beam includes RSRP of the first wide beam, and the information about the first narrow beam includes RSRP of the first narrow beam. The determining unit 902 is specifically configured to: determine the signal-to-interference ratio of the wide beam terminal based on a ratio of the RSRP of the first wide beam to the RSRP of the first narrow beam in the P narrow beams; and determine the signal-to-interference ratio of the narrow beam terminal based on a ratio of the RSRP of the first narrow beam to the RSRP of the first wide beam in the N wide beams.

Optionally, the determining unit 902 is further configured to: if the first narrow beam is not any one of the P pieces of narrow beam, determine not to transmit downlink data to the narrow beam terminal on the first narrow beam, and not to transmit downlink data to the wide beam terminal on the first wide beam.

Figure 10:
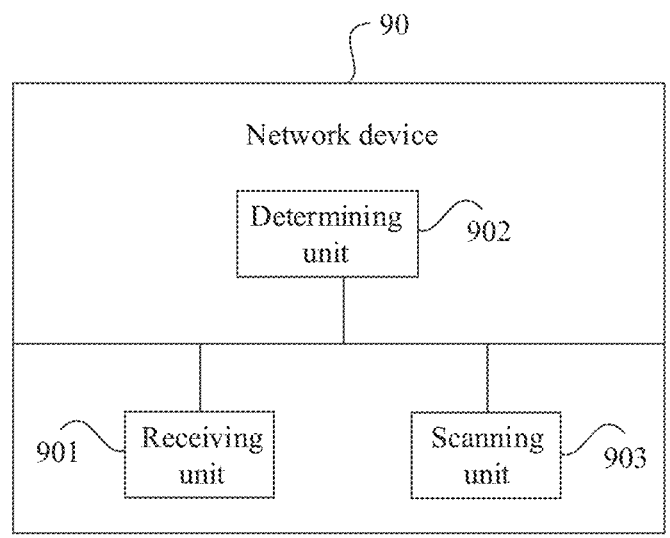
FIG. 10 is a schematic structural diagram of another network device according, to an embodiment of this application.

Optionally, the network device 90 may further include a scanning unit 903. FIG. 10 is a schematic structural diagram of another network device 90 according to an embodiment of this application. The scanning unit 903 is configured to: if P is greater than or equal to a fifth threshold, stop scanning the candidate narrow beam that is covered by the first wide beam and used for downlink sending.

Optionally, the scanning unit 903 is further configured to scan the candidate narrow beam that is covered by the first wide beam and used for downlink sending.

The network device 90 shown in this embodiment of the present invention may perform the technical solution of the downlink data transmission method on a network device 90 side shown in any one of the foregoing embodiments.

Implementation principles and beneficial effects of the network device 90 are similar, and details are not described herein again.

Figure 11:
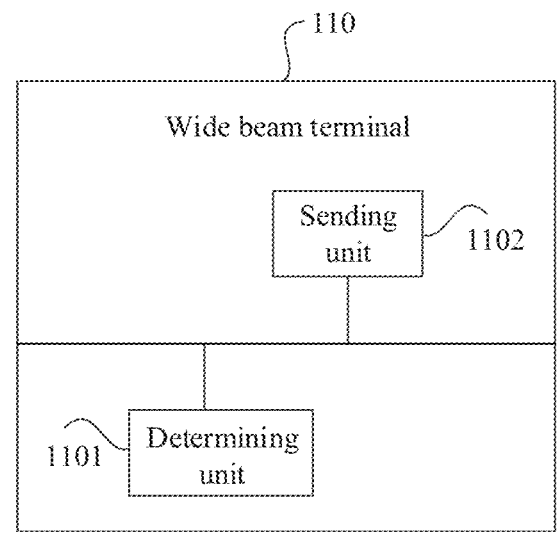
FIG. 11 is a schematic structural diagram of a wide beam terminal according to an embodiment of this application.

FIG. 11 is a schematic structural diagram of a wide beam terminal 110 according to an embodiment of this application. As shown in FIG. 11, the wide beam terminal 110 may include:

a determining unit 1101, configured to: when a candidate wide beam that is scanned by a base station and used for downlink sending is received, determine, from the candidate wide beam, information about a first wide beam to be used by the wide beam terminal 110 and information about M wide beams whose signal quality meets a first condition, where M is an integer greater than or equal to 1; and a sending unit 1102, configured to send first beam feedback information to the base station, where the first beam feedback information includes the information about the first wide beam and the information about the M wide beams.

Optionally, the M wide beams are M wide beams with minimum signal quality in the candidate wide beam. Alternatively, the M wide beams are M wide beams Whose signal quality is less than a first threshold in the candidate wide beam.

Figure 12:
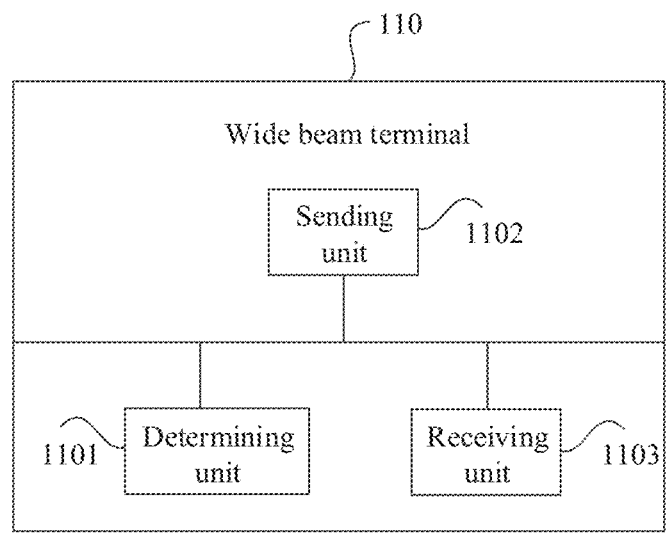
FIG. 12 is a schematic structural diagram of another wide beam terminal according to an embodiment of this application.

Optionally, the wide beam terminal 110 may further include a receiving unit 1103. FIG. 12 is a schematic structural diagram of another wide beam terminal 110 according to an embodiment of this application.

The receiving unit 1103 is configured to receive a candidate narrow beam that is scanned by the base station, covered by the first wide beam, and used for downlink sending, where the candidate narrow beam is sent by the base station when determining that a parent beam of a first narrow beam to be used by the narrow beam terminal is the first wide beam.

The determining unit 1101 is further configured to determine, from the candidate narrow beam, information about P narrow beams whose signal quality meets a third condition, where P is an integer greater than or equal to 1.

The sending unit 1102 is further configured to send a third beam feedback message to the base station, where the third beam feedback message includes the information about the P narrow beams.

Optionally, the P narrow beams are P narrow beams whose signal quality is less than a third threshold in the candidate narrow beam.

The wide beam terminal 110 shown in this embodiment of the present invention may perform the technical solution of the downlink data transmission method on a wide beam terminal 110 side shown in any one of the foregoing embodiments. Implementation principles and beneficial effects of the wide beam terminal 110 are similar, and details are not described herein again.

Figure 13:
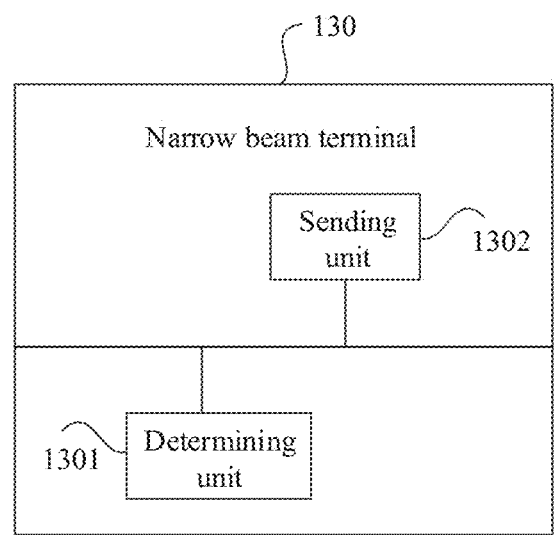
FIG. 13 is a schematic structural diagram of a narrow beam terminal according to an embodiment of this application.

FIG. 13 is a schematic structural diagram of a narrow beam terminal 130 according to an embodiment of this application. As shown in FIG. 13, the narrow beam terminal 130 may include:

a determining unit 1301, configured to: when a candidate wide beam that is scanned by a base station and used for downlink sending is received, determine, from the candidate wide beam, information about a second wide beam determined by the narrow beam terminal 130 and information about N wide beams whose signal quality meets a second condition, where N is an integer greater than or equal to 1; and a sending unit 1302, configured to send second beam feedback information to the base station, where the second beam feedback information includes the information about the second wide beam and the information about the N wide beams.

The determining unit 1301 is further configured to: when a candidate narrow beam that is scanned by the base station, covered by the second wide beam, and used for downlink sending is received, determine, from the candidate narrow beam covered by the second wide beam, a first narrow beam to be used by the narrow beam terminal 130.

The sending unit 1302 is further configured to send, to the base station, information about the first narrow beam to be used by the narrow beam terminal 130.

Optionally, the N wide beams are N wide beams with minimum signal quality in the candidate wide beam. Alternatively, the N wide beams are N wide beams whose signal quality is less than a second threshold in the candidate wide beam.

The narrow beam terminal 130 shown in this embodiment of the present invention may perform the technical solution of the downlink data transmission method on a narrow beam terminal 130 side shown in any one of the foregoing embodiments. Implementation principles and beneficial effects of the narrow beam terminal 130 are similar, and details are not described herein again.

Figure 14:
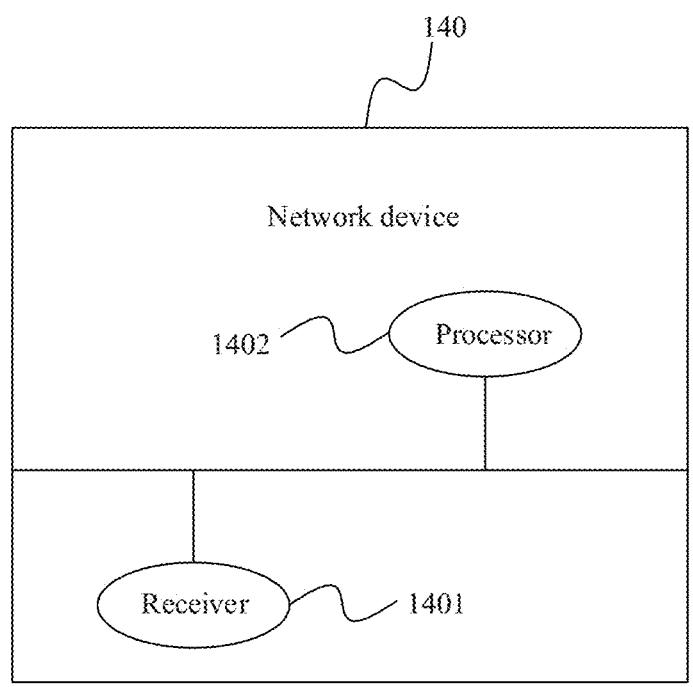
FIG. 14 is a schematic structural diagram of still another network device according to an embodiment of this application.

FIG. 14 is a schematic structural diagram of still another network device 140 according to an embodiment of this application. For example, as shown in FIG. 14, the network device 140 may include:

a receiver 1401, configured to: receive first beam feedback information from a wide beam terminal, where the first beam feedback information includes information about a first wide beam to be used by the wide beam terminal and information about M wide beams whose signal quality meets a first condition, and M is an integer greater than or equal to 1, where the receiver 1401 is further configured to receive second beam feedback information from a narrow beam terminal, where the second beam feedback information includes information about a second wide beam determined by the narrow beam terminal and information about N wide beams whose signal quality meets a second condition, and N is an integer greater than or equal to 1; and the receiver 1401 is further configured to receive, from the narrow beam terminal, information about a first narrow beam to be used by the narrow beam terminal, where the first narrow beam is a narrow beam covered by the second wide beam; and a processor 1402, configured to determine, based on the first beam feedback information, the second beam feedback information, and the information about the first narrow beam, whether to transmit downlink data to the wide beam terminal and the narrow beam terminal.

Optionally, the M wide beams are M wide beams with minimum signal quality in a candidate wide beam used for downlink sending. Alternatively, the M wide beams are M wide beams whose signal quality is less than a first threshold in a candidate wide beam.

The N wide beams are N wide beams with minimum signal quality in the candidate wide beam. Alternatively, the N wide beams are N wide beams whose signal quality is less than a second threshold in the candidate wide beam.

Optionally, the determining, based on the first beam feedback information, the second beam feedback information, and the information about the first narrow beam, whether to transmit downlink data to the wide beam terminal and the narrow beam terminal includes: when a parent beam of the first narrow beam is any one of the M wide beams, and the first wide beam is any one of the N wide beams, determining respective signal-to-interference ratios of the wide beam terminal and the narrow beam terminal; and if both the signal-to-interference ratio of the wide beam terminal and the signal-to-interference ratio of the narrow beam terminal are greater than a third threshold, determining to transmit downlink data to the narrow beam terminal on the first narrow beam, and transmit downlink data to the wide beam terminal on the first wide beam.

Optionally, the information about the first wide beam includes reference signal received power RSRP of the first wide beam, and the determining respective signal-to-interference ratios of the wide beam terminal and the narrow beam terminal includes: determining a product of RSRP of the parent beam, of the first narrow beam, in the M wide beams and a parameter, where the parameter is a square of a maximum gain difference; determining the signal-to-interference ratio of the wide beam terminal based on a ratio of the RSRP of the first wide beam to the product; and determining the signal-to-interference ratio of the narrow beam terminal based on a ratio of an RSRP of the first narrow beam to the RSRP of the first wide beam in the N wide beams.

Optionally, the receiver 1401 is further configured to: when a parent beam of the first narrow beam is the first wide beam, receive a third beam feedback message from the wide beam terminal, where the third beam feedback message includes information about P narrow beams whose signal quality meets a third condition, and P is an integer greater than or equal to 1.

The determining, based on the first beam feedback information, the second beam feedback information, and the information about the first narrow beam, whether to transmit downlink data to the wide beam terminal and the narrow beam terminal includes: determining, based on the first narrow beam and the third beam feedback message, whether to transmit downlink data to the narrow beam terminal on the first narrow beam, and transmit downlink data to the wide beam terminal on the first wide beam.

Optionally, the determining, based on the first narrow beam and the third beam feedback message, whether to transmit downlink data to the narrow beam terminal on the first narrow beam, and transmit downlink data to the wide beam terminal on the first wide beam includes: if the first narrow beam is any, one of the P narrow beams, determining respective signal-to-interference ratios of the wide beam terminal and the narrow beam terminal; and if both the signal-to-interference ratio of the wide beam terminal and the signal-to-interference ratio of the narrow beam terminal are greater than a fourth threshold, determining to transmit downlink data to the narrow beam terminal on the first narrow beam, and transmit downlink data to the wide beam terminal on the first wide beam.

Optionally, the information about the first wide beam includes RSRP of the first wide beam, and the determining respective signal-to-interference ratios of the wide beam terminal and the narrow beam terminal includes: determining the signal-to-interference ratio of the wide beam terminal based on a ratio of the RSRP of the first wide beam to an RSRP of the first narrow beam in the P narrow beams; and determining the signal-to-interference ratio of the narrow beam terminal based on a ratio of the RSRP of the first narrow beam to the RSRP of the first wide beam in the N wide beams.

Optionally, the determining, based on the first narrow beam and the third beam feedback message, whether to transmit downlink data to the narrow beam terminal on the first narrow beam, and transmit downlink data to the wide beam terminal on the first wide beam further includes: if the first narrow beam is not any one of the P pieces of narrow beam, determining not to transmit downlink data to the narrow beam terminal on the first narrow beam, and not to transmit downlink data to the wide beam terminal on the first wide beam.

Optionally, the processor 1402 is further configured to: if P is greater than or equal to a fifth threshold, stop scanning a candidate narrow beam that is covered by the first wide beam and used for downlink sending.

Optionally, the processor 1402 is further configured to scan the candidate narrow beam that is covered by the first wide beam and used for downlink sending.

The network device 140 shown in this embodiment of the present invention may perform the technical solution of the downlink data transmission method on a network device 140 side shown in any one of the foregoing embodiments. Implementation principles and beneficial effects of the network device 140 are similar, and details are not described herein again.

Figure 15:
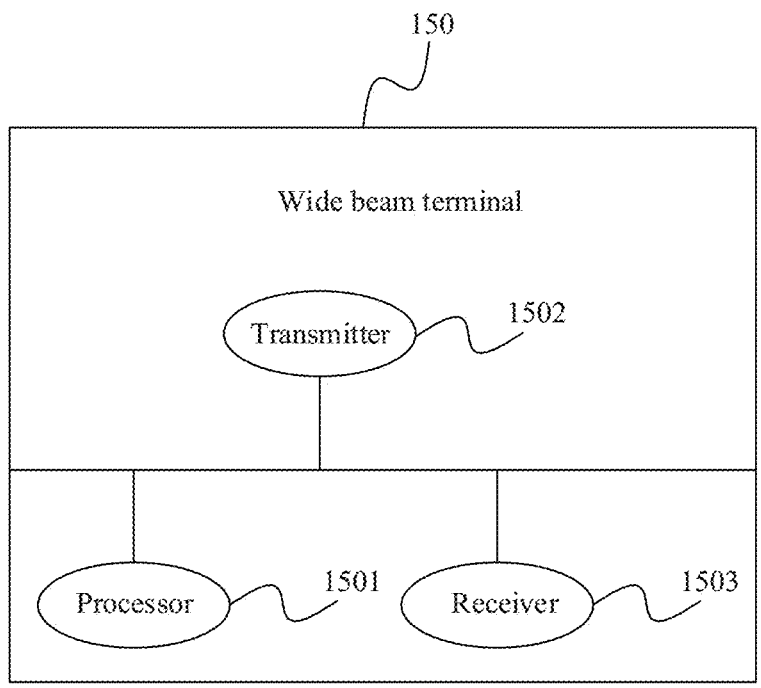
FIG. 15 is a schematic structural diagram of still another wide beam terminal according to an embodiment of this application.

FIG. 15 is a schematic structural diagram of still another wide beam terminal 150 according to an embodiment of this application. For example, as shown in FIG. 15, the wide beam terminal 150 may include:

a processor 1501, configured to: when a candidate wide beam that is scanned by a base station and used for downlink sending is received, determine, from the candidate wide beam, information about a first wide beam to be used by the wide beam terminal 150 and information about M wide beams whose signal quality meets a first condition, where M is an integer greater than or equal to 1; and a transmitter 1502, configured to send first beam feedback information to the base station, where the first beam feedback information includes the information about the first wide beam and the information about the M wide beams.

Optionally, the M wide beams are M wide beams with minimum signal quality in the candidate wide beam. Alternatively, the M wide beams are M wide beams whose signal quality is less than a first threshold in the candidate wide beam.

Optionally, the wide beam terminal 150 may further include a receiver 1503. The receiver 1503 is configured to receive a candidate narrow beam that is scanned by the base station, covered by the first wide beam, and used for downlink sending, where the candidate narrow beam is sent by the base station when determining that a parent beam of a first narrow beam to be used by a narrow beam terminal is the first wide beam.

The processor 1501 is further configured to determine, from the candidate narrow beam, information about P narrow beams whose signal quality meets a third condition, where P is an integer greater than or equal to 1.

The transmitter 1502 is further configured to send a third beam feedback message to the base station, where the third beam feedback message includes the information about the P narrow beams.

The wide beam terminal 150 shown in this embodiment of the present invention may perform the technical solution of the downlink data transmission method on a wide beam terminal 150 side shown in any one of the foregoing embodiments. Implementation principles and beneficial effects of the wide beam terminal 150 are similar, and details are not described herein again.

Figure 16:
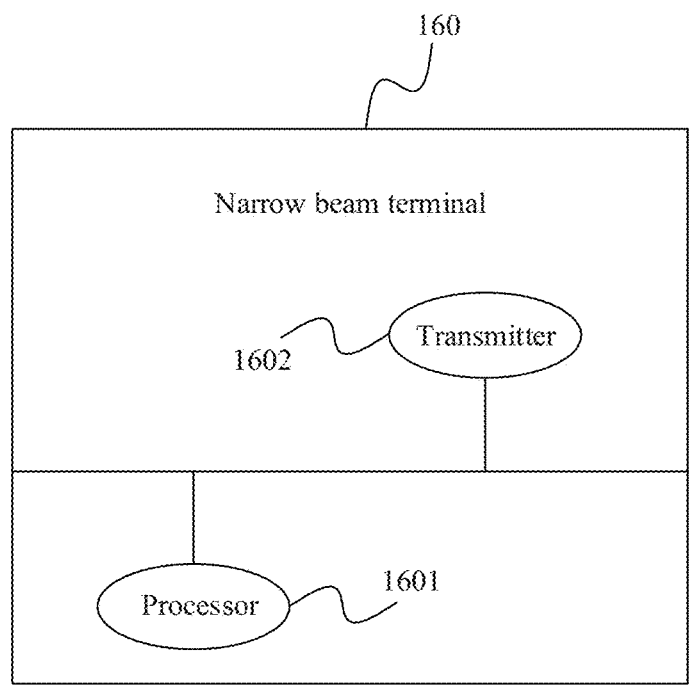
FIG. 16 is a schematic structural diagram of still another narrow beam terminal according to an embodiment of this application.

FIG. 16 is a schematic structural diagram of still another narrow beam terminal 160 according to an embodiment of this application. For example, as shown in FIG. 16, the narrow beam terminal 160 may include:

a processor 1601, configured to: when a candidate wide beam that is scanned by a base station and used for downlink sending is received, determine, from the candidate wide beam, information about a second wide beam determined by the narrow beam terminal 160 and information about N wide beams whose signal quality meets a second condition, where N is an integer greater than or equal to 1; and a transmitter 1602, configured to send second beam feedback information to the base station, where the second beam feedback information includes the information about the second wide beam and the information about the N wide beams.

The processor 1601 is further configured to: when a candidate narrow beam that is scanned by the base station, covered by the second wide beam, and used for downlink sending is received, determine, from the candidate narrow beam covered by the second wide beam, a first narrow beam to be used by the narrow beam terminal 160.

The transmitter 1602 is further configured to send, to the base station, information about the first narrow beam to be used by the narrow beam terminal 160.

Optionally, the N wide beams are N wide beams with minimum signal quality in the candidate wide beam. Alternatively, the N wide beams are N wide beams whose signal quality is less than a second threshold in the candidate wide beam.

The narrow beam terminal 160 shown in this embodiment of the present invention may perform the technical solution of the downlink data transmission method on a narrow beam terminal 160 side shown in any one of the foregoing embodiments. Implementation principles and beneficial effects of the narrow beam terminal 160 are similar, and details are not described herein again.

An embodiment of this application further provides a communications system. The communications system includes the network device, the wide beam terminal, and the narrow beam terminal shown in any one of the foregoing embodiments. Implementation principles and beneficial effects of the communications system are similar, and details are not described herein again.

An embodiment of this application further provides a computer-readable storage medium. The computer-readable storage medium stores a computer program, and when the computer program is executed by a processor, the downlink data transmission method on a network device side shown in any one of the foregoing embodiments is performed. Implementation principles and beneficial effects of the computer-readable storage medium are similar, and details are not described herein again.

An embodiment of this application further provides a computer-readable storage medium. The computer-readable storage medium stores a computer program, and when the computer program is executed by a processor, the downlink data transmission method on a wide beam terminal side shown in any one of the foregoing embodiments is performed, or the downlink data transmission method on the wide beam terminal side shown in any one of the foregoing embodiments is performed. Implementation principles and beneficial effects of the computer-readable storage medium are similar, and details are not described herein again.

An embodiment of this application further provides a circuit system. The circuit system may include a processing circuit.

After receiving first beam feedback information from a wide beam terminal, receiving second beam feedback information from a narrow beam terminal, and receiving, from the narrow beam terminal, information about a first narrow beam to be used by the narrow beam terminal, where the first narrow beam is a narrow beam covered by a second wide beam, the processing circuit is configured to: determine, based on the first beam feedback information, the second beam feedback information, and the information about the first narrow beam, whether to transmit downlink data to the wide beam terminal and the narrow beam terminal. The first beam feedback information includes information about a first wide beam to be used by the wide beam terminal and information about M wide beams whose signal quality meets a first condition, Where M is an integer greater than or equal to 1. The second beam feedback information includes information about the second wide beam determined by the narrow beam terminal and information about N wide beams whose signal quality meets a second condition, where N is an integer greater than or equal to 1.

Optionally, the M v aide beams are M wide beams with minimum signal quality in a candidate wide beam used for downlink sending. Alternatively, the M wide beams are M wide beams whose signal quality is less than a first threshold in a candidate wide beam.

The N wide beams are N wide beams with minimum signal quality in the candidate wide beam. Alternatively, the N wide beams are N wide beams whose signal quality is less than a second threshold in the candidate wide beam.

Optionally, the determining, based on the first beam feedback information, the second beam feedback information, and the information about the first narrow beam, whether to transmit downlink data to the wide beam terminal and the narrow beam terminal includes:

when a parent beam of the first narrow beam is any one of the M wide beams, and the first wide beam is any one of the N wide beams, determining respective signal-to-interference ratios of the wide beam terminal and the narrow beam terminal; and if both the signal-to-interference ratio of the wide beam terminal and the signal-to-interference ratio of the narrow beam terminal are greater than a third threshold, determining to transmit downlink data to the narrow beam terminal on the first narrow beam, and transmit downlink data to the wide beam terminal on the first wide beam.

Optionally, the information about the first wide beam includes reference signal received power RSRP of the first wide beam, and the determining respective signal-to-interference ratios of the wide beam terminal and the narrow beam terminal includes: determining a product of RSRP of the parent beam, of the first narrow beam, in the M wide beams and a parameter, where the parameter is a square of a maximum gain difference; determining the signal-to-interference ratio of the wide beam terminal based on a ratio of the RSRP of the first wide beam to the product; and determining the signal-to-interference ratio of the narrow beam terminal based on a ratio of an RSRP of the first narrow beam to the RSRP of the first wide beam in the N wide beams.

Optionally, a parent beam of the first narrow beam is the first wide beam, and the determining, based on the first beam feedback information, the second beam feedback information, and the information about the first narrow beam, whether to transmit downlink data to the wide beam terminal and the narrow beam terminal includes: determining, based on the first narrow beam and a third beam feedback message, whether to transmit downlink data to the narrow beam terminal on the first narrow beam, and transmit downlink data to the wide beam terminal on the first wide beam, where the third beam feedback message includes information about P narrow beams whose signal quality meets a third condition, and P is an integer greater than or equal to 1.

Optionally, the determining, based on the first narrow beam and a third beam feedback message, whether to transmit downlink data to the narrow beam terminal on the first narrow beam includes: if the first narrow beam is any one of the P narrow beams, determining respective signal-to-interference ratios of the wide beam terminal and the narrow beam terminal; and if both the signal-to-interference ratio of the wide beam terminal and the signal-to-interference ratio of the narrow beam terminal are greater than a fourth threshold, determining to transmit downlink data to the narrow beam terminal on the first narrow beam, and transmit downlink data to the wide beam terminal on the first wide beam.

Optionally, the information about the first wide beam includes RSRP of the first wide beam, and the determining respective signal-to-interference ratios of the wide beam terminal and the narrow beam terminal includes: determining the signal-to-interference ratio of the wide beam terminal based on a ratio of the RSRP of the first wide beam to an RSRP of the first narrow beam in the P narrow beams; and determining the signal-to-interference ratio of the narrow beam terminal based on a ratio of the RSRP of the first narrow beam to the RSRP of the first wide beam in the N wide beams.

Optionally, the determining, based on the first narrow beam and a third beam feedback message, whether to transmit downlink data to the narrow beam terminal on the first narrow beam further includes: if the first narrow beam is not any one of the P pieces of narrow beam, determining not to transmit downlink data to the narrow beam terminal on the first narrow beam, and not to transmit downlink data to the wide beam terminal on the first wide beam.

Optionally, the processing circuit is further configured to: if P is greater than or equal to a fifth threshold, stop scanning a candidate narrow beam that is covered by the first wide beam and used for downlink sending.

Optionally, the processing circuit is further configured to scan the candidate narrow beam that is covered by the first wide beam and used for downlink sending.

The circuit system shown in this embodiment of the present invention may perform the technical solution of the downlink data transmission method on a network device side shown in any one of the foregoing embodiments. Implementation principles and beneficial effects of the circuit system are similar, and details are not described herein again.

An embodiment of this application further provides a circuit system. The circuit system may include a processing circuit.

The processing circuit is configured to: when a candidate wide beam that is scanned by a base station and used for downlink sending is received, determine, from the candidate wide beam, information about a first wide beam to be used by a wide beam terminal and information about M wide beams whose signal quality meets a first condition, where M is an integer greater than or equal to 1.

Optionally, the M wide beams are M wide beams with minimum signal quality in the candidate wide beam. Alternatively, the M wide beams are M wide beams whose signal quality is less than a first threshold in the candidate wide beam.

Optionally, the processing circuit is further configured to: after a candidate narrow beam that is scanned by the base station, covered by the first wide beam, and used for downlink sending is received, determine, from the candidate narrow beam, information about P narrow beams whose signal quality meets a third condition, where P is an integer greater than or equal to 1, and the candidate narrow beam is sent by the base station when determining that a parent beam of a first narrow beam to be used by a narrow beam terminal is the first wide beam.

The wide beam terminal shown in this embodiment of the present invention may perform the technical solution of the downlink data transmission method on a wide beam terminal side shown in any one of the foregoing embodiments. Implementation principles and beneficial effects of the wide beam terminal are similar, and details are not described herein again.

An embodiment of this application further provides a circuit system. The circuit system may include a processing circuit.

The processing circuit is configured to: when a candidate wide beam that is scanned by a base station and used for downlink sending is received, determine, from the candidate wide beam, information about a second wide beam determined by a narrow beam terminal and information about N wide beams whose signal quality meets a second condition, where N is an integer greater than or equal to 1.

The processing circuit is further configured to: after second beam feedback information is sent to the base station, when a candidate narrow beam that is scanned by the base station, covered by the second wide beam, and used for downlink sending is received, determine, from the candidate narrow beam covered by the second wide beam, a first narrow beam to be used by the narrow beam terminal, where the second beam feedback information includes the information about the second wide beam and the information about the N wide beams.

Optionally, the N wide beams are N wide beams with minimum signal quality in the candidate wide beam. Alternatively, the N wide beams are N wide beams whose signal quality is less than a second threshold in the candidate wide beam.

The narrow beam terminal shown in this embodiment of the present invention may perform the technical solution of the downlink data transmission method on a narrow beam terminal side shown in any one of the foregoing embodiments. Implementation principles and beneficial effects of the narrow beam terminal are similar, and details are not described herein again.

In the foregoing embodiments, the processor may be a general-purpose processor, a digital signal processor (digital signal processor, DSP), or the like, which may implement or execute the methods, steps, and logical block diagrams disclosed in the embodiments of the present invention. The general-purpose processor may be a microprocessor, or the processor may be any conventional processor or the like. Steps of the methods disclosed with reference to the embodiments of the present invention may be directly executed and accomplished by using a hardware decoding processor, or may be executed and accomplished by using a combination of hardware and a software module in the decoding processor. The software module may be located in a mature storage medium in the art, such as a random access memory (random access memory, RAM), a flash memory, a read-only memory (read-only memory, ROM), a programmable read-only memory, an electrically erasable programmable memory, a register, or the like. The storage medium is located in a memory 1002, and the processor 1001 reads an instruction in the memory 1002 and completes the steps in the foregoing methods in combination with hardware of the processor.

In the several embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The foregoing integrated unit may be implemented in a form of hardware, or may be implemented in a form of a combination of hardware and a software functional unit.

What is claimed is:

1. A method comprising:
receiving first beam feedback information from a wide beam terminal, wherein the first beam feedback information comprises first information about a first wide beam to be used by the wide beam terminal and second information about M wide beams, wherein first signal qualities of the M wide beams meet a first condition, and wherein M is an integer greater than or equal to one;
receiving second beam feedback information from a narrow beam terminal, wherein the second beam feedback information comprises third information about a second wide beam and fourth information about N wide beams, wherein second signal qualities of the N wide beams meet a second condition, and wherein N is an integer greater than or equal to one;
receiving, from the narrow beam terminal, fifth information about a first narrow beam to be used by the narrow beam terminal, wherein the second wide beam covers the first narrow beam; and
determining, based on the first beam feedback information, the second beam feedback information, and the fifth information, whether to transmit downlink data to the wide beam terminal and the narrow beam terminal.

2. The method of claim 1, wherein the first signal qualities and second signal qualities comprise a minimum signal quality in a candidate wide beam that is used for downlink sending.

3. The method of claim 1, further comprising:
determining a first signal-to-interference ratio of the wide beam terminal and a second signal-to-interference ratio of the narrow beam terminal when a parent beam of the first narrow beam comprises one of the M wide beams and the first wide beam comprises one of the N wide beams; and
determining to transmit the downlink data to the narrow beam terminal on the first narrow beam and the wide beam terminal on the first wide beam when both the first signal-to-interference ratio and the second signal-to-interference ratio are greater than a third threshold.

4. The method of claim 3, wherein the first information comprises a first reference signal received power (RSRP) of the first wide beam, wherein the fifth information comprises a second RSRP of the first narrow beam, and, wherein the method further comprises:
determining a product of a third RSRP of the parent beam and a square of a maximum gain difference;
determining the first signal-to-interference ratio based on a first ratio of the first RSRP to the product; and
determining the second signal-to-interference ratio based on a second ratio of the second RSRP to the first RSRP.

5. The method of claim 1, further comprising:
receiving a third beam feedback message from the wide beam terminal when a parent beam of the first narrow beam is the first wide beam, wherein the third beam feedback message comprises sixth information about P narrow beams, wherein third signal qualities of the P narrow beams meet a third condition, and wherein P is an integer greater than or equal to one; and
determining, based on the first narrow beam and the third beam feedback message, whether to transmit the downlink data to the narrow beam terminal on the first narrow beam and the wide beam terminal on the first wide beam.

6. The method of claim 5, further comprising:
determining a first signal-to-interference ratio of the wide beam terminal and a second signal-to-interference ratio of the narrow beam terminal when the first narrow beam is one of the P narrow beams; and
determining to transmit the downlink data to the narrow beam terminal on the first narrow beam and the wide beam terminal on the first wide beam when both the first signal-to-interference ratio and the second signal-to-interference ratio are greater than a fourth threshold.

7. The method of claim 6, wherein the first information comprises a first reference signal received power (RSRP) of the first wide beam, wherein the third information comprises a second RSRP of the first narrow beam, and wherein the method further comprises:
determining the first signal-to-interference ratio based on a first ratio of the first RSRP to the second RSRP; and
determining the second signal-to-interference ratio based on a second ratio of the second RSRP to the first RSRP.

8. The method of claim 6, further comprising determining not to transmit the downlink data to the narrow beam terminal on the first narrow beam and the wide beam terminal on the first wide beam when the first narrow beam is not one of the P narrow beams.

9. The method of claim 5, wherein before determining whether to transmit the downlink data to the narrow beam terminal on the first narrow beam and the wide beam terminal on the first wide beam, the method further comprises stopping scanning a candidate narrow beam that is covered by the first wide beam and is used for downlink sending when P is greater than or equal to a fifth threshold.

10. The method of claim 5, wherein before receiving the third beam feedback message, the method further comprises scanning a candidate narrow beam that is covered by the first wide beam and is used for downlink sending.

11. The method of claim 1, wherein the first signal qualities comprise a minimum signal quality in a candidate wide beam that is used for downlink sending, and wherein each of the second signal qualities is less than a second threshold in the candidate wide beam.

12. The method of claim 1, wherein each of the first signal qualities is less than a first threshold in a candidate wide beam that is used for downlink sending, and wherein the second signal qualities comprise a minimum signal quality in the candidate wide beam.

13. The method of claim 1, wherein each of the first signal qualities is less than a first threshold in a candidate wide beam that is used for downlink sending.

14. The method of claim 13, wherein each of the second signal qualities is less than a second threshold in the candidate wide beam.

15. A downlink data transmission method comprising:
    receiving, from a base station, a candidate wide beam for downlink sending;
    determining, from the candidate wide beam, first information about a first wide beam of a narrow beam terminal and second information about N wide beams, wherein signal qualities of the N wide beams meet a first condition, and wherein N is an integer greater than or equal to one;
    sending first beam feedback information comprising the first information and the second information to the base station;
    receiving, from the base station, a candidate narrow beam for the downlink sending, wherein the first wide beam covers the candidate narrow beam;
    determining, from the candidate narrow beam, a first narrow beam to be used by the narrow beam terminal; and
    sending, to the base station, third information about the first narrow beam.

16. The method of claim 15, wherein the N wide beams comprise a minimum signal quality in the candidate wide beam.

17. The method of claim 15, wherein each of the signal qualities is less than a threshold in the candidate wide beam.

18. A terminal comprising:
    a processor configured to:
       receive, from a base station, a candidate wide beam for downlink sending; and
       determine, from the candidate wide beam, first information about a first wide beam of the terminal and second information about N wide beams, wherein signal qualities of the N wide beams meet a first condition, wherein N is an integer greater than or equal to one; and
    a transmitter coupled to the processor and configured to send first beam feedback information comprising the first information and the second information to the base station,
    wherein the processor is further configured to:
       receive, from the base station, a candidate narrow beam for the downlink sending, wherein the first wide beam covers the candidate narrow beam; and
       determine, from the candidate narrow beam, a first narrow beam to be used by the terminal, and
    wherein the transmitter is further configured to send, to the base station, third information about the first narrow beam.

19. The terminal of claim 18, wherein the N wide beams comprise a minimum signal quality in the candidate wide beam.

20. The terminal of claim 18, wherein each of the signal qualities is less than a threshold in the candidate wide beam.

* * * * *